US 9,218,172 B2

(12) United States Patent
Nagasaka et al.

(10) Patent No.: US 9,218,172 B2
(45) Date of Patent: Dec. 22, 2015

(54) INFORMATION MANAGEMENT APPARATUS, FUNCTION MANAGEMENT METHOD, COMPUTER PROGRAM, AND INFORMATION PROCESSING SYSTEM

(75) Inventors: Hideo Nagasaka, Kanagawa (JP); Tadaaki Kimijima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 462 days.

(21) Appl. No.: 12/902,403

(22) Filed: Oct. 12, 2010

(65) Prior Publication Data

US 2011/0093580 A1 Apr. 21, 2011

(30) Foreign Application Priority Data

Oct. 20, 2009 (JP) ................. P2009-241512

(51) Int. Cl.
*G06F 15/173* (2006.01)
*G06F 9/445* (2006.01)

(52) U.S. Cl.
CPC ...................... *G06F 8/60* (2013.01)

(58) Field of Classification Search
CPC ........................................... G06F 8/60
USPC ........................................... 709/223
See application file for complete search history.

(56) References Cited

U.S. PATENT DOCUMENTS

| | | | |
|---|---|---|---|
| 6,233,570 B1 | 5/2001 | Horvitz et al. | |
| 7,051,327 B1 * | 5/2006 | Milius et al. | 717/177 |
| 7,286,256 B2 * | 10/2007 | Herbert | 358/1.16 |
| 2006/0179484 A1 * | 8/2006 | Scrimsher et al. | 726/23 |
| 2007/0214165 A1 * | 9/2007 | Hidaka et al. | 707/101 |
| 2008/0127220 A1 * | 5/2008 | Morris | 719/320 |
| 2008/0201778 A1 * | 8/2008 | Guo et al. | 726/23 |
| 2008/0235356 A1 | 9/2008 | Miyoshi et al. | |

FOREIGN PATENT DOCUMENTS

| | | |
|---|---|---|
| JP | 11-143695 | 5/1999 |
| JP | 2008-021095 | 1/2008 |
| JP | 2008-084321 | 4/2008 |
| JP | 2008-234596 | 10/2008 |
| WO | WO 98/03907 A2 | 1/1998 |

* cited by examiner

*Primary Examiner* — Joseph Greene
(74) *Attorney, Agent, or Firm* — Oblon, McClelland, Maier & Neustadt, L.L.P.

(57) ABSTRACT

An information processing apparatus includes a function management unit, a function-information acquisition unit, and a function-presenting unit. The function management unit manages an application having one or more functions and being capable of directly invoking any of the functions, where the management of the application is performed on a basis of the function. The function-information acquisition unit acquires information about functions relative to a running function of another application on a basis of the function being managed by the function management unit. The function-presenting unit that presents the information about functions acquired by the function-information acquisition unit.

20 Claims, 17 Drawing Sheets

FIG. 5

```
APPLICATION REGISTRATION INFORMATION (Appinfo)
<XML>
    <APP NAME> XXXX
    <APP STYLE> on Web
        <FUNCTION>
                <1> FUNCTION 1  PHOTO MANAGEMENT
                        <CATEGORY> MediaManager
                        <INPUT FILE> jpg
                        <OUTPUT FILE> jpg
                        <COMMAND> picture
                <2> FUNCTION 2  MUSIC MANAGEMENT
                        <CATEGORY> MediaManager
                        <INPUT FILE> mp3
                        <OUTPUT FILE> mp3
                        <COMMAND> music
                <3> FUNCTION 3  VIDEO MANAGEMENT
                        <CATEGORY> MediaManager
                        <INPUT FILE> mpeg
                        <OUTPUT FILE> mpeg
                        <COMMAND> movie
        </FUNCTION>
</XML>
```

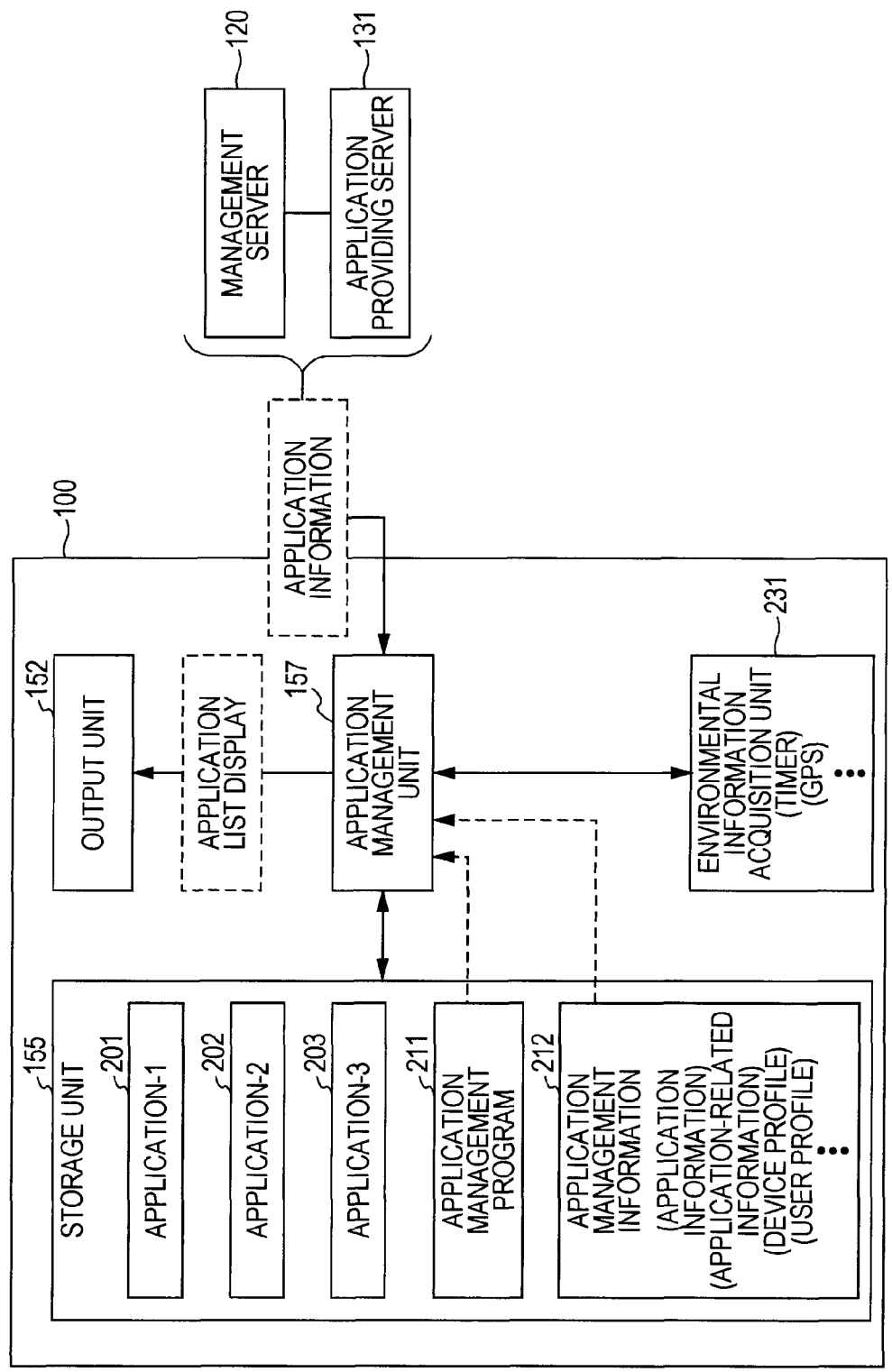

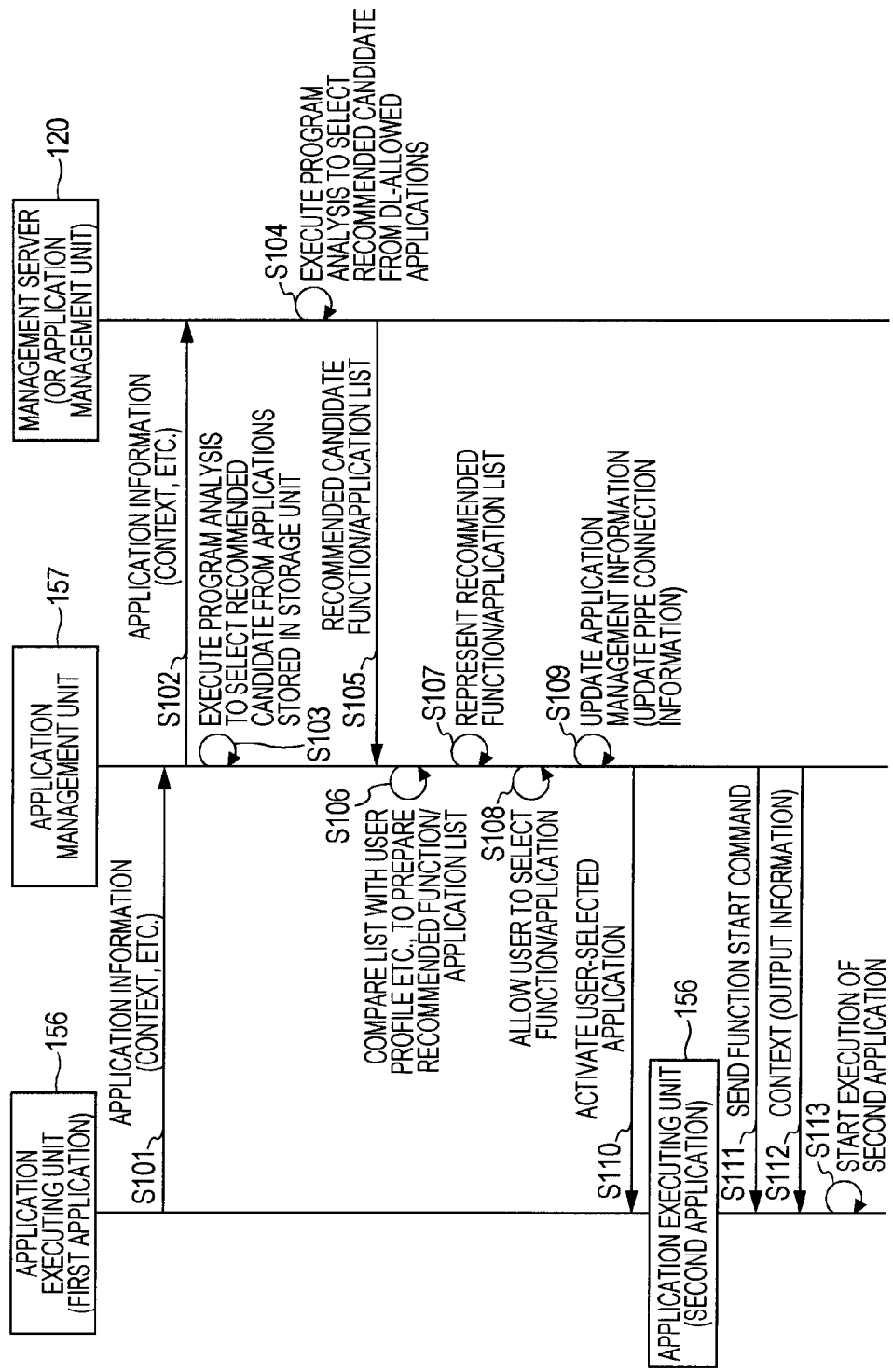

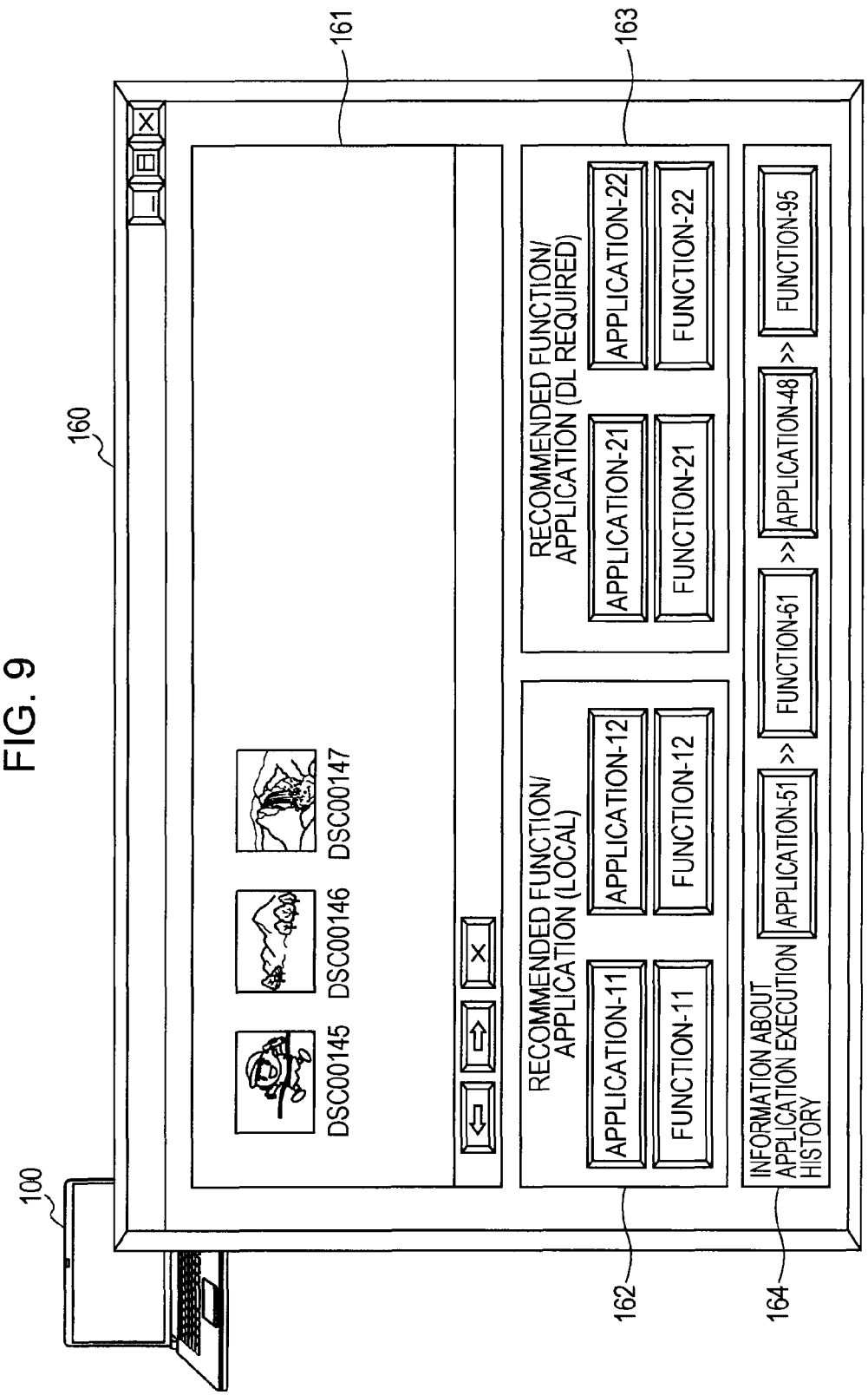

FIG. 10

| | FUNCTION TYPE | CONTENTS OF FUNCTION |
|---|---|---|
| (a) | MEDIA EDITOR | CONTENT EDITING FUNCTION |
| (b) | MEDIA UPLOADER | CONTENT UPLOADING FUNCTION (TO WEB SERVICE SERVER, ETC.) |
| (c) | MEDIA CONVERTER | CONTENT CONVERTING FUNCTION (IMAGE ROTATION, EXPANSION, REDUCTION, ETC.) |
| (d) | MEDIA MANAGER | FUNCTION OF EXECUTING OVERALL MANAGEMENT OF CONTENT PROCESSING (BROWSE AND SAVE) (FUNCTION OF EXECUTING PROCESSING COMBINED WITH FUNCTIONS OF MEDIA DATA AND MEDIA BROWSER) |
| (e) | MEDIA DATABASE | FUNCTION OF EXECUTING DATABASE MANAGEMENT, SUCH AS STORAGE OR DELETION OF CONTENTS |
| (f) | MEDIA BROWSER | CONTENT BROWSING FUNCTION |

FIG. 14

```
APPLICATION REGISTRATION INFORMATION (Appinfo)
<XML>
   <APP NAME> XXXX
      <ver> 2.0  ◄─────────────────────────┐
                     EXTRACT NEW FUNCTION   │
      <FUNCTION>     BY COMPARING VERSIONS  │
         <1> FUNCTION 1  PHOTO MANAGEMENT   │
               <INPUT FILE> jpg             │
               <OUTPUT FILE> jpg            │
               <add ver> Ver1.0             │
         <2> FUNCTION 2  MUSIC MANAGEMENT   │
               <INPUT FILE> mp3             │
               <OUTPUT FILE> mp3            │
               <add ver> Ver1.2             │
         <3> FUNCTION 3  VIDEO MANAGEMENT   │
               <INPUT FILE> mpeg            │
               <OUTPUT FILE> mpeg           │
               <add ver> Ver1.2             │
         <4> FUNCTION 4  3D PHOTO PROCESSING│
               <INPUT FILE> jpg             │
               <OUTPUT FILE> jpg            │
              (  <add ver> Ver2.0  )────────┘
      </FUNCTION>
</XML>
```

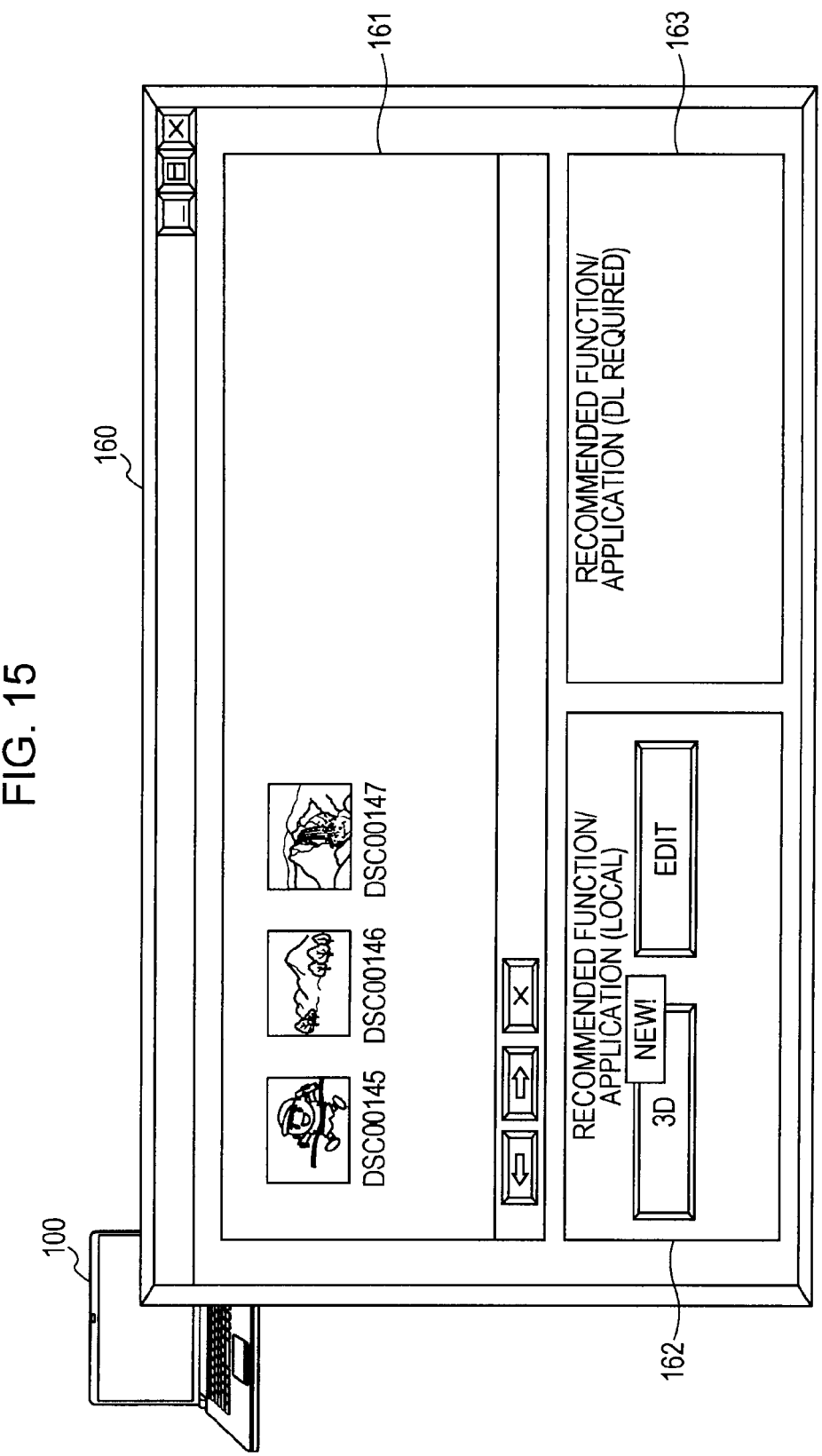

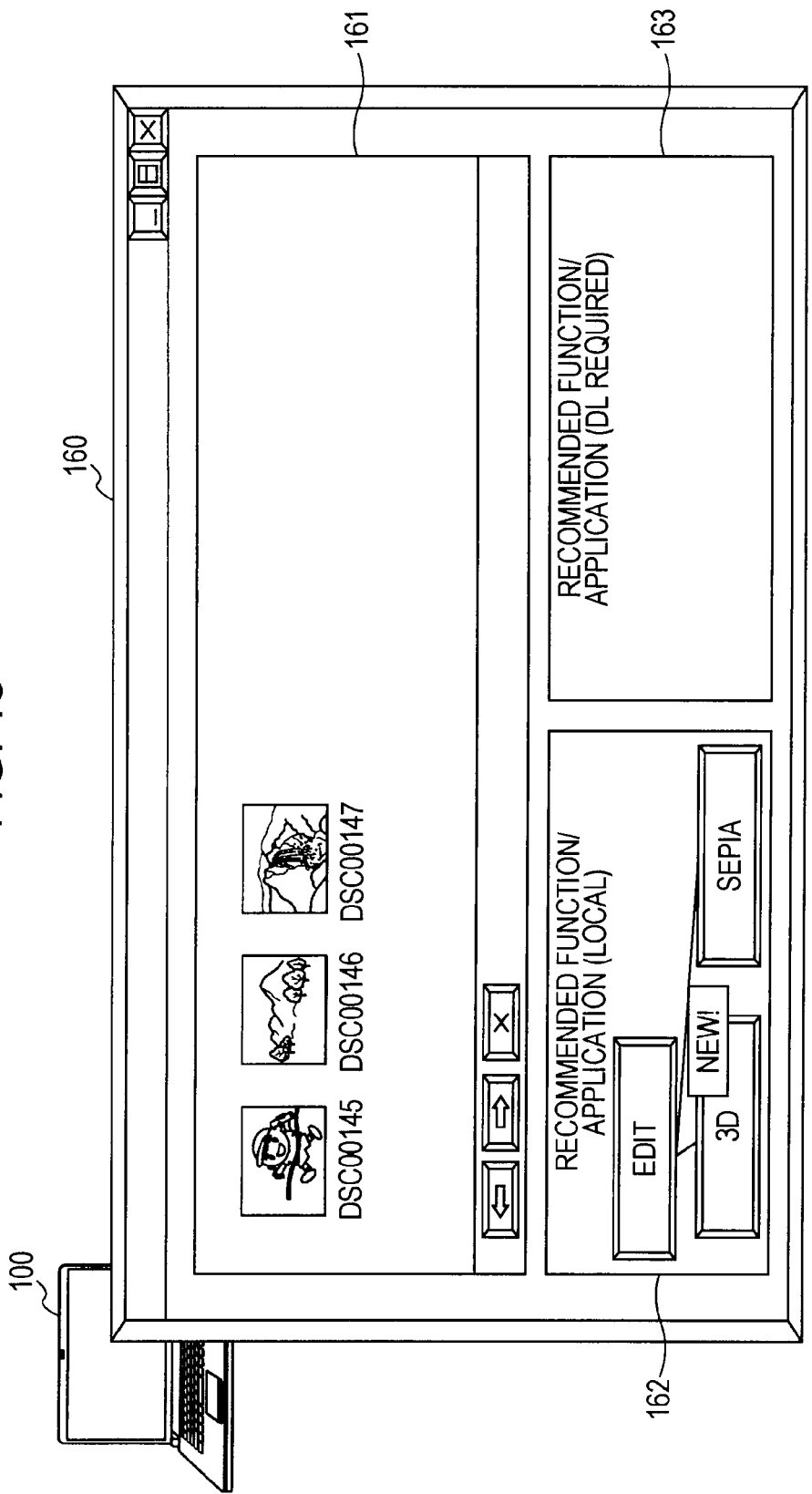

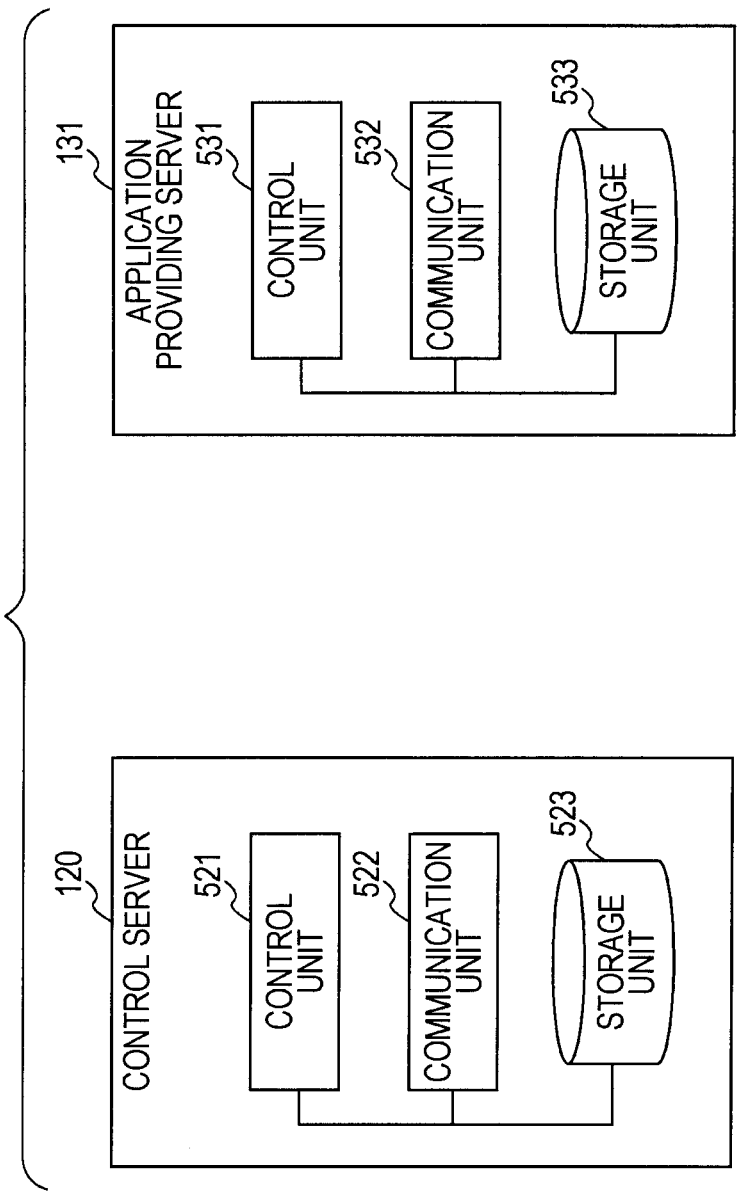

INFORMATION MANAGEMENT APPARATUS, FUNCTION MANAGEMENT METHOD, COMPUTER PROGRAM, AND INFORMATION PROCESSING SYSTEM

BACKGROUND OF THE INVENTION

1. Field of the Invention

The present invention relates to an information processing apparatus, a function management method, a computer program, and an information processing system.

2. Description of the Related Art

An information processing apparatus, such as a personal computer (PC) or a handheld terminal (e.g., a cellular phone or a portable game machine), uses various applications and programs to carry out various kinds of information processing. For instance, the user may purchase from a dealer a CD-ROM or the like in which a desired application is stored. Then, the user installs the application from the purchased CD-ROM into a PC. Alternatively, the user may download the application from a server through a network to run the application on the PC.

The number of user-available applications is increasing day by day with popularization of the Internet. Although these applications are supplied from application providers, it is very difficult for users to correctly understand their respective contents and executable processing. Even if the user purchases or downloads a new desired application and then installs it into a PC or the like, the application does not typically execute processing being up to user's expectations.

On the other hand, systems for searching contents, such as music and movies, are considerably satisfied by their users. Among the systems, for example, a content presenting system, which has been used in the art, allows a content-providing server to automatically search a desired content with characteristics similar to those of one acquired by the user and then recommends the content selected as a search result to the user. Japanese Unexamined Patent Application Publication No. 2008-234596 discloses a system that performs a process of editing a content acquired from the content-providing server and then uploads the edited content to its own server, followed by providing another user with the content. In this manner, various proposals for search and circulation systems for contents, such as music and movies, have been proposed.

However, applications for executing data processing, in contrast to music contents or the like, have been desired to satisfy a wide variety of demands, such as demands for their abilities of executing user-demanded data processing and their compatibilities with other applications being already used by the user. Thus, there is a difficulty in recommending or providing appropriate application. Even if such recommendation or provision of an appropriate application is only based on user's preference information like the one about music contents, the user does not satisfy the application in many cases.

Therefore, various proposals have been made for providing a process for presenting application programs for carrying out various kinds of data processing and a technology for adequately constructing the execution environments and assisting user's operation of the applications (see, for example, Japanese Unexamined Patent Application Publication No. 2008-84321, 11-143695, and 2008-21095.

SUMMARY OF THE INVENTION

The typical process for presenting applications has been designed to carry out, during the execution of a certain application, a process for presenting an additional application that assists a function being executed by the certain application. For example, when the user executes an application that allows the user to browse images shot by a digital video camera on a PC, an application for processing a desired image among the browsed images is automatically searched and then displayed on the screen of the PC to present the application to the user.

Currently, however, various functions are incorporated in one application. Even if the user is presented with an appropriate application, the user may have no way to recognize what the user should do with the application. For example, if the presented application (here, temporarily referred to as application A) includes an image-selecting function, a music-selecting function, and a video-selecting function and the application A is presented to the user while another application B is being executed, the user may have no way to find an appropriate function from these functions in the application A to efficiently perform a desired operation.

The present invention has been made in consideration of the above problems. It is desirable to provide an information processing apparatus, a function management method, a computer program, and an information processing system, which are novel and improved, being capable of presenting the user with a suitable function in an application by managing the application on function basis when the application has one or more functions and any of the functions can be directly invoked and executed.

Addressing the problems described above, an embodiment of the present invention is an information processing apparatus that includes a function management unit, a function-presenting unit, and a function-information acquisition unit. The function management unit manages an application having one or more functions and being capable of directly invoking any of the functions, where the management of the application is performed on a basis of the function. The function-information acquisition unit acquires information about functions relative to a running function of another application on a basis of the function being managed by the function management unit. The function-presenting unit presents information about the function acquired by the function-information transmitting unit.

The above information processing apparatus may further include an application executing unit that selects one function from the functions acquired by the function-information acquisition unit and executes the one function of the application. The application executing unit may select one function from the functions acquired by the function-information acquisition unit and then directly invoke and execute the one function of the application.

The above information processing apparatus may further include a recommendation control unit that includes the unit of the application or the application in response to the running function of the another application. The recommendation control unit determine an application or a function thereof recommended on the basis of the function unit of the function managing unit.

The recommendation control unit may determine an application or function to be recommended, based on the information about the another application in execution.

The recommendation control unit may further include a presentation unit that presents the application or function recommended by the recommendation control unit to the another application.

The presentation unit may hierarchically present the function recommended by the recommendation control unit when the function management unit manages the functions of the application in a hierarchical structure.

The function management unit may manage the functions of the application on a version basis.

The recommendation control unit may extract and recommend a function newly added to the application. Furthermore, the recommendation control unit may extract the function newly added to the application and recommends this function on a priority basis.

Addressing the problems described above, an embodiment of the present invention is a function management method that includes the steps of: function management to manage an application having one or more functions and being capable of invoking any of the functions, where the management of the application is performed on a basis of the function; function information acquisition to acquire information about functions relative to a running function of another application on a basis of the function being managed by the step of function management; and function presentation to present the information about functions acquired by the step of function information acquisition.

Addressing the problems described above, an embodiment of the present invention is a computer program, wherein a computer is allowed to execute steps of: function management to manage an application having one or more functions and being capable of invoking any of the functions, where the management of the application is performed on a basis of the function; function-information acquisition to acquire information about functions relative to a running function of another application on a basis of the function being managed by the step of function management; and function-presenting to present the information about functions acquired by the step of function information acquisition.

Addressing the problems described above, an embodiment of the present invention is an information processing system, including: an information processing apparatus that executes an application having one or more functions; and a management server that manages the application on a function basis. The management server includes a function management unit that manages an application having one or more functions and being capable of directly invoking any of the functions, where the management of the application is performed on a basis of the function, a function-information acquisition unit that allows the information processing apparatus to obtain information about functions relative to a running function of another application and acquires the information on a basis of the function being managed by the function management unit, and a function-information notifying unit that notifies the information about functions acquired in the function information acquisition unit to the information processing apparatus in responses to an inquiry from the information processing apparatus. The information processing apparatus includes a function-information transmitting unit that transmits information about a running function of another application in the information processing apparatus to the management server, and a function-presenting unit that presents information about the function acquired from the management server.

As described above, according to any embodiment of the present invention, an information management apparatus, a function management method, a computer program, and an information processing system, which are novel and improved, can be provided, where an application having one or more functions is managed on a function basis to present a suitable function of the application to the user when the application is executable while the function thereof is directly invoked.

BRIEF DESCRIPTION OF THE DRAWINGS

FIG. 5 is a diagram illustrating an example of information corresponding to each of applications;

FIG. 6 is a diagram illustrating an exemplary process executed by the application management unit;

FIG. 8 is a flow chart representing the presentation procedure for applications or the functions thereof to the user of the information processing apparatus;

FIG. 9 is a diagram illustrating a case where information about history of executing an application is displayed;

FIG. 10 is a diagram illustrating the function of an application carried by the information processing apparatus;

FIG. 14 is an explanatory diagram illustrating an example of the application registration information (Appinfo) to be used for the presentation of information about new function;

FIG. 15 is a diagram illustrating an example in which information about a new additional function added by the upgrade of an application;

FIG. 16 is a diagram illustrating an example in which the functions of an application are hierarchically displayed and managed; and FIG. 17 is a diagram illustrating the configuration of a managing server and an application offer server according to one embodiment of a the present invention.

DESCRIPTION OF THE PREFERRED EMBODIMENTS

The suitable embodiment of the present invention is described in detail, referring to an accompanying drawing below. In this specification and a drawing, duplication explanation is omitted by attaching the same mark about the constituent factor which has the same functional constitution substantially.

Explanation will be given in the following order:
<1. One embodiment of the present invention>
[1-1. Configuration of information processing system]
[1-2. Configuration of information processing apparatus]
[1-3. Outline of application management information]

[1-4. Outline of application/function registration information]
[1-5. Exemplary processing of application management unit]
[1-6. Presentation procedure for application/function]
[1-7. Presentation procedure for new function]
<2. Conclusion>

1. ONE EMBODIMENT OF THE PRESENT INVENTION

1-1. Configuration of Information Processing System

Figure 1:
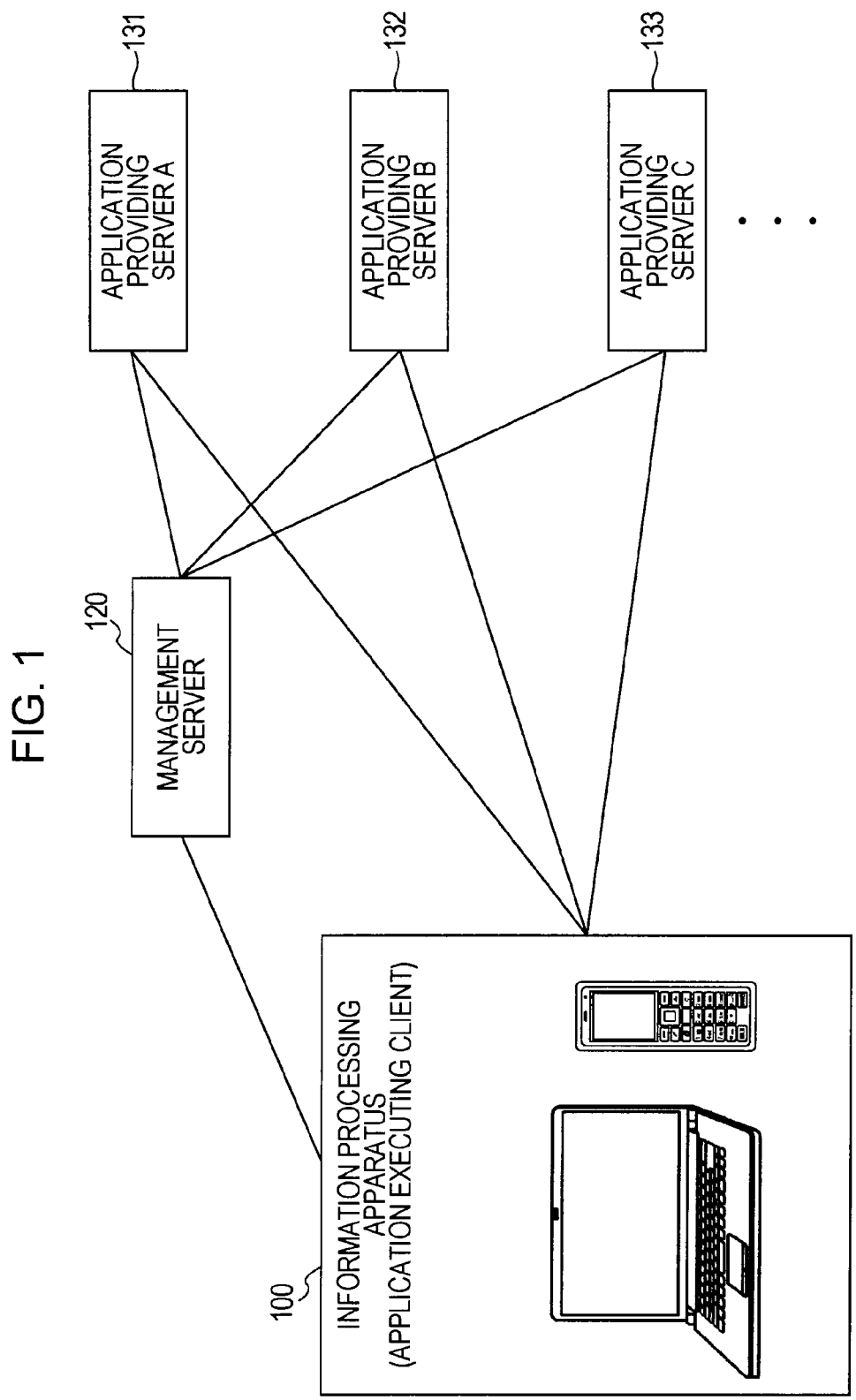
FIG. 1 is a diagram illustrating the configuration of the information processing system according to the embodiment of the present invention.

First, the configuration of an information processing system according to an embodiment of the present invention and an information processing system will be described. FIG. 1 is a diagram illustrating the configuration of the information processing system according to the embodiment of the present invention. Hereinafter, the configuration of the information processing system according to the embodiment of the present invention will be described with reference to FIG. 1.

As shown in FIG. 1, the information processing system 1 according to the embodiment of the present invention includes an information processing apparatus 100, a management server 120, and application providing servers 131, 132, 133, . . . .

The information processing apparatus 100 is an application execution client that executes various kinds of applications; for example, it may be an apparatus having a function of executing an application program, such as a personal computer or a handheld terminal. The application program is installed into, for example, a hard disk in the information processing apparatus 100 and then executed after reading out from the hard disk in response to a start instruction. Examples of the application include an image browsing application, a music reproduction application, a music editing application, a text generation application, a game application, a map-route search application program, an accounting process application program, and a mail creation application program. The user can execute and use an application having a desired function among various applications.

The information processing apparatus 100 includes a central processing unit (CPU) that serves as a program-executing function and a memory that serves as a section for storing application programs and data, such as a hard disk, a random access memory (RAM), or a read only memory (ROM). Programs to be executed by the information processing apparatus 100 include an operation system (OS) and application programs. The information processing apparatus 100 stores applications in the memory. Each application may be one installed from a medium, such as CD-ROM, or one downloaded through a network. The user may properly select and execute any of these applications.

An application providing server A 131, an application providing server B 132, and an application providing server C 133, which are shown in FIG. 1 are servers that provide the information processing apparatus 100 with various applications, respectively. Applications provided from the respective application providing servers are chargeable or free of charge. The information processing apparatus 100 can download any of the applications supplied from the respective application providing servers A to C, 131 to 133, through the network and then store the downloaded application into the memory. Subsequently, the information processing apparatus 100 can execute the application.

The management server 120 shown in FIG. 1 takes out information about the applications supplied from the application providing servers A to C, 131 to 133, from the application providing servers A to C, 131 to 133 and then manages the obtained information, respectively. The management server 120 provides the information processing apparatus 100, which can be used by the user, with the obtained information.

On the basis of the application information received from the management server 120, the information processing apparatus 100 carries out processing, such as a process of displaying a screen that presents applications which can be used by the information processing apparatus 100 utilized by the user. For example, the information processing apparatus 100 generates information about other applications relative to the application being executed in the information processing apparatus 100 or generates recommendation information about the functions of the application. Then, the information processing apparatus 100 displays the information on a display mounted on or connected to the information processing apparatus 100.

Specifically, for example, the information processing apparatus 100 provides the user with information about the relevant applications that carry out processing, such an image editing process and an image management process. Examples of the relevant application include an image editing application and an image upload service application.

As shown in FIG. 1, the management server 120 is a server separated from application providing servers A, B and C, 131, 132 and 133. Alternatively, the management server 120 itself may also be configured to have functions of an application providing server.

In the above description, the configuration of the image processing system 1 according to the embodiment of the present invention has been described with reference to FIG. 1. Next, the configuration of the image processing apparatus 100 according to the embodiment of the present invention will be described.

1-2. Configuration of Information Processing Apparatus

Figure 2:
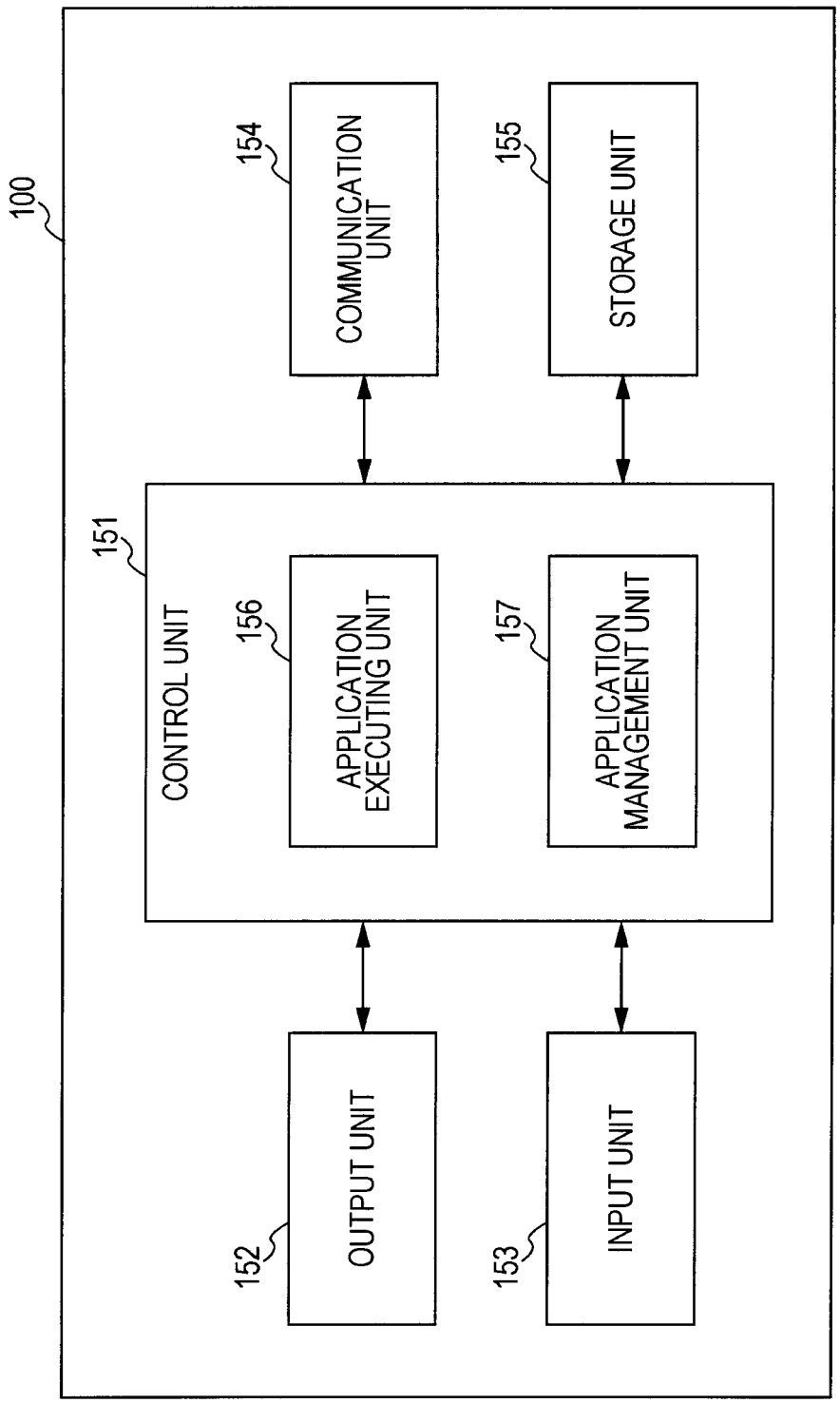
FIG. 2 is a diagram illustrating the configuration of the information processing apparatus according to the embodiment of the present invention.

FIG. 2 is a diagram illustrating the configuration of the information processing apparatus 100 according to the embodiment of the present invention. Hereinafter, the configuration of the information processing apparatus 100 according to the embodiment of the present invention will be described with reference to FIG. 2.

As shown in FIG. 2, the information processing apparatus 100 according to the embodiment of the present invention includes a control unit 151, an output unit 152, an input unit 153, a communication unit 154, and a storage unit 155.

The control unit 151 includes a CPU or the like and is provided for controlling each unit of the information processing apparatus 100. According to the present embodiment, the control unit 151 serves as each of an information-acquiring unit and a function-presenting unit and obtains information from a management server 120 or the like, followed by presenting the obtained information to the output unit. The output unit 152 includes a display device, such as a liquid crystal display (LCD) or an organic EL display, and a sound-output speaker. The input unit 153 includes a keyboard and various kinds of input operation parts. Alternatively, the input unit 153 may be a combined structure between an output unit and an output panel, such as a touch panel.

The communication unit 154 carries out communication with any of external apparatuses through a network such as the Internet. As shown in FIG. 1, for example, the external apparatuses may be the management server 120 and the application providing servers 131 to 133. The storage unit 155 stores applications and various data. The storage unit 155 may be, for example, any of a hard disk, a flash memory, a random access memory (RAM), a read only memory (ROM).

The control unit 151 includes an application executing unit 156 and an application management unit 157.

The application executing unit 156 executes an application program. The application program to be executed by the application executing unit 156 is stored in the storage unit 155, or the like. The storage unit 155 is also used as a storage area for storing parameters and data which are used in the execution of an application.

In addition, the storage unit 155 is also used for storing an application management program and storing application management information. The application management is responsible for managing applications stored in the storage unit 155 and the application management information is responsible for managing an application stored in the storage unit 155. The application management information includes information generated from the application management section 157 of the control unit 151 and information supplied from the management server 120. As has been described above, the management server 120 shown in FIG. 1 provides the information processing apparatus 100 with information about applications supplied from the respective application providing servers 131 to 133.

The application management unit 157 executes an application management program stored in the storage section 155 to carry out a process of presenting a recommended related application and related function on the basis of, for example, the information received from the information received from the management server 120.

Figure 3:
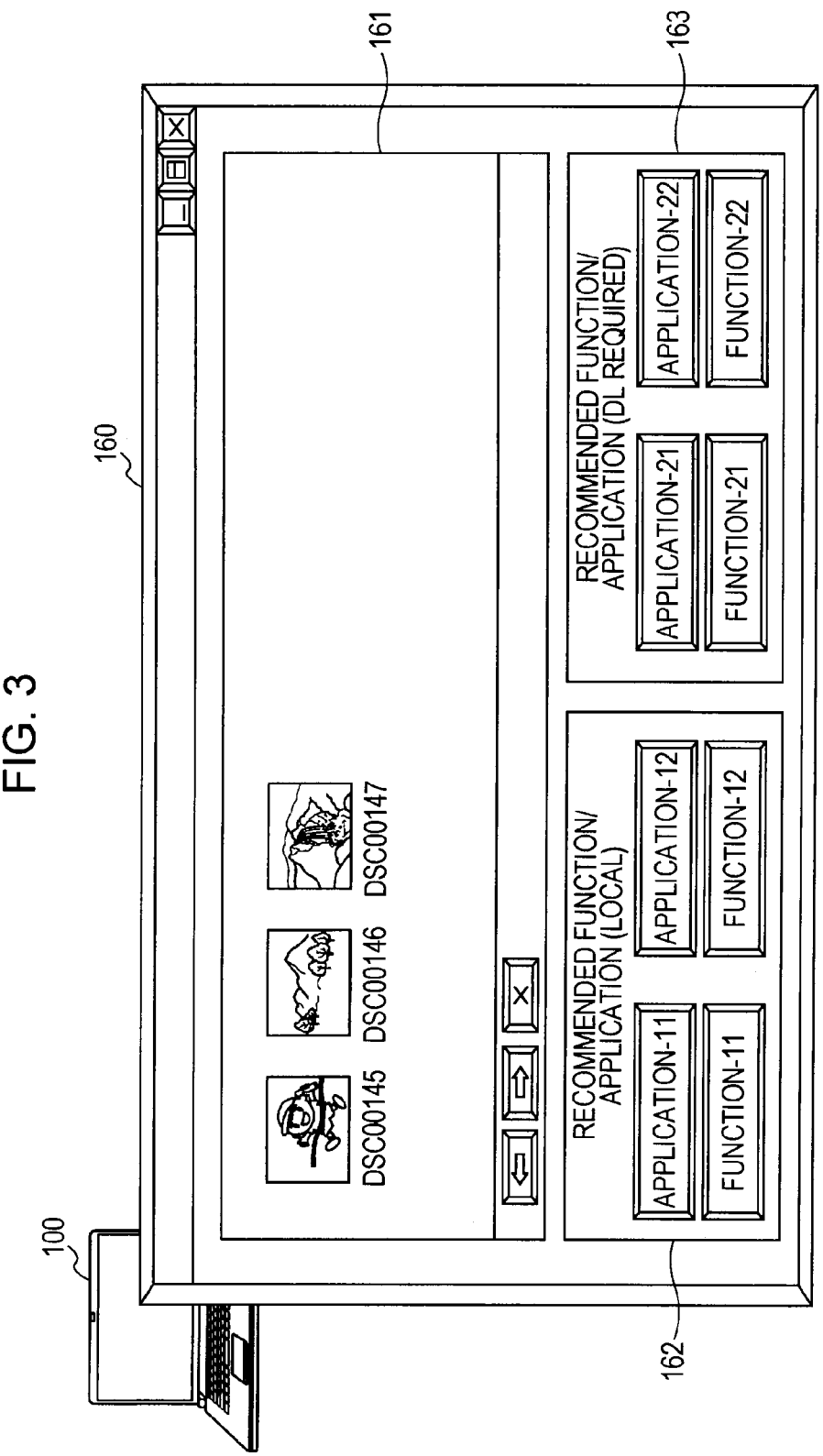
FIG. 3 is a diagram illustrating an example of a screen displayed on a display of the information processing apparatus.

FIG. 3 is a diagram illustrating an example of a screen displayed on a display 160 of the information processing apparatus 100. In other words, FIG. 3 illustrates a case where an application execution area 161 and function/application recommendation list display areas 162 and 163 are displayed on the display 160.

The application execution area 161 is an area used by the application being executed by the information processing apparatus 100. FIG. 3 illustrates a case where an image browsing application for browsing image data by the information processing apparatus 100 is being executed while the application execution area 161 displays the image data stored in the inside of the information processing apparatus 100.

The function/application recommendation list display areas 162 and 163, which are displayed on the lower side of the application execution area 161, show application information relative to the application being executed in the application execution area 161. In other words, the application information is the information on a list of other applications recommended to the user who is executing a certain application on the application execution area 161. The display data, such as icons corresponding to the respective applications displayed on the function/application recommendation list display areas 162 and 163, includes embedded link information for carrying out a process of invoking each application to allow the user to invoke a desired application by clicking the corresponding icon.

Any application to be displayed on the function/application recommendation list display areas 162 and 163 can be generated using application information that the information processing apparatus 100 receives from the management server 120.

The example shown in FIG. 3, an image browsing application is executed on the application execution area 161. Thus, the function/application recommendation list display areas 162 and 163 display the information corresponding to applications related to the image browsing application, such as an image editing application, an image scrapbook application, and an image upload service application. Furthermore, if one application has a plurality of functions, the function/application recommendation list display area 162 or 163 displays the information corresponding to a function relative to the function of a present application in execution among those functions. The function/application recommendation list display areas 162 and 163 display icons corresponding to the respective applications, the descriptive information about the applications, and the like.

The left function/application recommendation list display area 162 displays information corresponding to applications which have been executed in the past and information corresponding to applications related to the current application in execution. These pieces of the information are application information about application programs being stored in the local storage unit of the information processing apparatus 100 and capable of immediately starting. In the example shown in FIG. 3, "APPLICATION-11" and "APPLICATION-12" are applications which have already been stored in the local storage unit. In addition, the function/application recommendation list display area 162 displays information corresponding to the specific function of the application which has been executed in the past and information corresponding to the specific function of the application relative to the current application in execution. These pieces of the information are represented as "Function 11" and "Function 12.

On the other hand, the right function/application recommendation list display area 163 displays application information corresponding to an application downloadable from the application providing server 131 or the like. This downloadable (DL) application has not been stored in the local storage unit of the information processing apparatus 100. In the example shown in FIG. 3, "APPLICATION-21" and "APPLICATION-22" are downloadable applications. In addition, the function/application recommendation list display area 163 displays information corresponding to the specific functions, such as "FUNCTION-21" and "FUNCTION-22", of an application relative to the current application in execution among the downloadable (DL) applications which can be downloaded from the application providing servers 131 or the like but not stored in the local recording unit of the information processing apparatus 100.

The application management unit 157 generates application management information that includes information about the relevance of a plurality of applications based on the information received from the management server 120 and then stores the application management information into the storage unit 155. The application management unit 157 updates the application management information in responses to the execution of the application in the information processing apparatus 100 or the acquisition of the application.

The application management unit 157 executes various processes, such as the acquisition of application information from the management server 120, the generation and update of application management information, and the storing of the application management information to the storage unit 155.

The application management unit 157 may also carry out a data conversion process desired in the case of using common data between different applications. In addition, the application management unit 157 may store management information such as one about parameters or the like to be transferred between the applications into the storage unit 155 and manage the information therein. When an application to be executed on the application execution unit 156 is switched from one to another, the above management information stored in the storage unit 155 is employed to carry out the transfer of data between the applications smoothly.

1-3. Outline of Application Management Information

Figure 4:
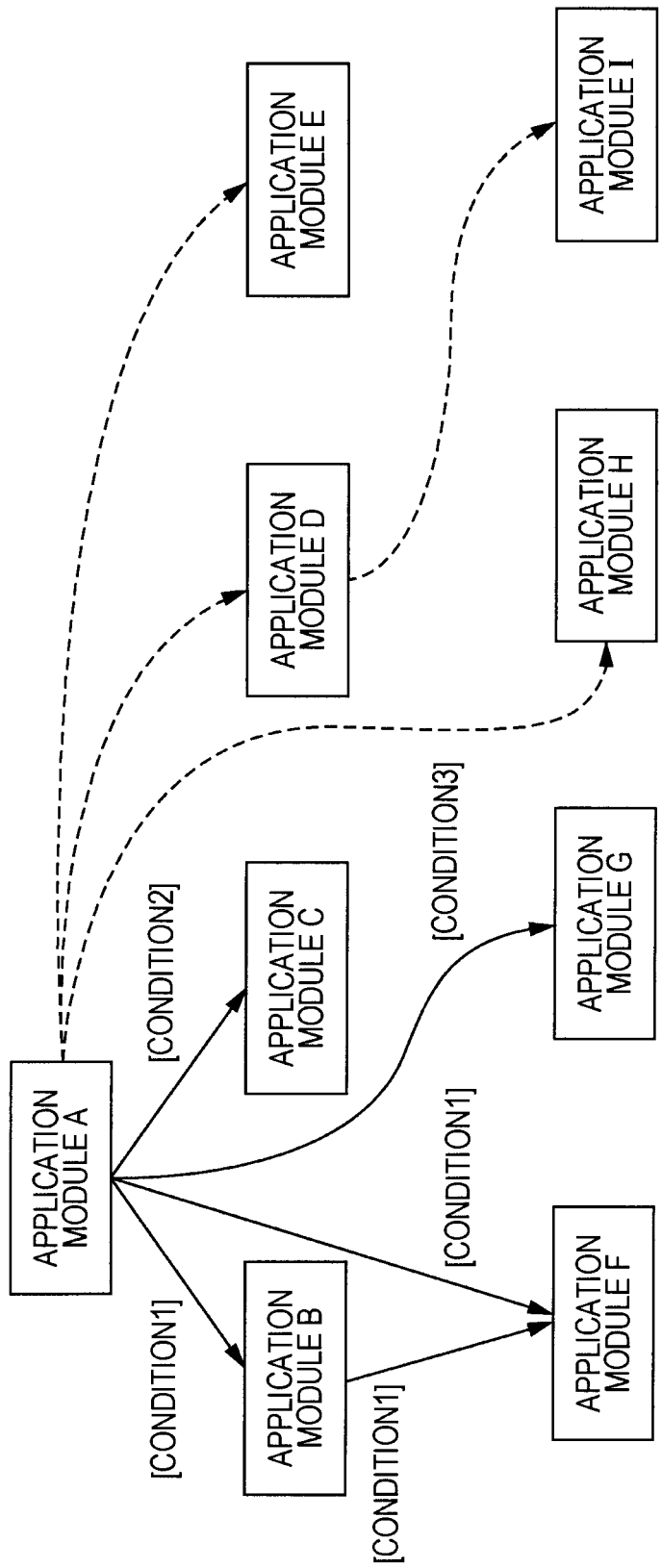
FIG. 4 is a diagram illustrating the outline of application management information.

Here, the outline of the application management information generated by the application management unit 157 will be described with reference to FIG. 4. FIG. 4 is a diagram illustrating the outline of application management information. The application management information shown in FIG. 4 is exemplary application management information representing relationships among application programs. Here, the application management information includes various kinds of information. The information shown in FIG. 4 is part of the application management information representing relationships among application programs.

Application modules A to I shown in FIG. 4 correspond one on one to applications. Any of application modules A, B, C, F, and G connected to another application mode by the solid line arrow in FIG. 4 is one in which an application program is stored in the local storage unit, the storage unit 155 shown in FIG. 2, of the information processing apparatus 100.

These applications are those having their respective histories of past usage in the information processing apparatus 100. If the application module (e.g., application module A in FIG. 4) located at the origin of the solid arrow (starting point) is a first execution application, then a second application subsequently executed is an application module located at the end of the arrow (endpoint). Thus, the application modules B, C, F, and G are equivalent to the second applications.

These applications are connected to one another by the solid arrows to make connections, for example "A-B", "A-C", "A-F", and "A-G". These combinations of the applications connected by the actual arrows are registered as pipe-connection applications.

These pipe-connection applications are candidates to be displayed on the function/application recommendation list display area 162 on the lower left of the display 150 previously described with reference to FIG. 3. For example, if the application A shown in FIG. 4 is being executed in the application execution area 161, an application connected to the application A by the solid line, or each of the applications B, C, F, and G in pipe-connection is a representation candidate to be displayed on the function/application recommendation list display area 162 shown in FIG. 3.

Arrows represented by dotted lines (imaginary lines) in FIG. 4 point to applications which have interactions with one another but have not been subjected to application switching in the past. In the example shown in FIG. 4, the combinations of the application modules A and D, A and E, A and H, and D and I fall under such a category of interaction. Their related application information is also registered as application management information. By the way, the application A is stored in the local storage unit in the information processing apparatus 100, but the applications D, E, H, and I may be not stored in the local storage unit in the information processing apparatus 100.

For example, when the application D is selected and executed during the execution of the application A by the user, the application A and the application D are connected by the solid line. In other words, they are registered as pipe-connection application as "A-D".

In addition, "CONDITION 1" to "CONDITION 3" shown in FIG. 4 are the pieces of information representing the conditions which can be carried out with high possibility by switching the applications. In other words, if the application module at the origin of the solid arrow (starting point) is an execution application, the condition is one by which it is more likely to be switched to the application at the end of the arrow (endpoint).

The condition with high possibility of switching the present execution application to another application includes the following pieces of information.

(1) Context information, for example, information about the execution state of the application at the time of application switching. Specifically, the pieces of information include information at the time of browsing photos, performing online processing, or the like and also include utilization time information and positional information. The information acquired by the timer, GPS, or the like of the information processing apparatus will be used.

(2) Hardware information: for example, functional information on the information processing apparatus, such as information about the presence or absence of GPS, image processing functions, and audio processing functions.

(3) User profile: for example, User's preference information which is automatically acquired from categories or the like of user's execution applications and then stored in the storage unit.

(4) Condition information: for example, file types available as an application execution environment and functions used therein.

As described above, for example, if the application module A shown in FIG. 4 is executed in the application execution area 161 on the display 150 shown in FIG. 2, the order of representing the candidates displayed on the lower left function/application recommendation list display area 162, the applications B, C, F, and G shown in FIG. 4, is determined by the application management unit 157 based on the condition at the time of executing the application module A. The candidate displayed on the lower right function/application recommendation list display area 163 is applications D, E, H, and I as shown in FIG. 4. However, the application management unit 157 determines such display order according to the conditions of the execution time of application module A.

Furthermore, the connections out of the condition are not subjected to the order of representation based on the condition.

Here, "CONDITION 1", "CONDITION 2", and "CONDITION 3" shown in FIG. 4 represent conditions under which switching among applications can be easily occurred, respectively. For example, if the application A is being executed, "CONDITION" that defines what kind of parameters the execution of application B can be facilitated is recorded as "CONDITION 1".

These pieces of condition information are obtained and sequentially updated and registered by the application management unit 157 when the user switches one application to another. In other words, the aforementioned information, (1) context information, (2) hardware information, (3) user profile, and (4) condition information, is acquired and updated at the time of the application switching.

The above condition information is also included in the application information supplied from the application providing servers 131 to 133 to the management server 120 shown in FIG. 1. The application management unit 157 of the information processing apparatus 100 can register a primary stage condition based on the application information acquired from the management server 120.

1-4. Outline of Application/Function Registration Information

Next, an example of the registration information about each of the functions of the respective applications will be described. FIG. 5 is a diagram illustrating an example of application registration information (Appinfo) about a certain application executed in the information processing apparatus 100 according to the embodiment of the present invention. Hereinafter, the application registration information will be described with reference to FIG. 5.

Application respiration information (Appinfo) is described by Extensible Markup Language (XML), for example, as shown in FIG. 5. The application registration information shown in FIG. 5 is represented as one about an application with the name of "XXXX" written in the field of "APP NANE". Here, "APP STYLE" refers to the style of providing the application. In this example, it indicates that the application is available through the Web.

Parameters in the subsequent field tagged with "FUNCTION" are listed to represent the functions of the application. As shown in FIG. 5, the application has three functions. A first action, FUNCTION 1, is a function of managing photos; a second function, FUNCTION 2, is a function of managing pieces of music; and a third function, FUNVTION 3, is a function of managing videos.

In the fields of the information about the respective functions, a function category, an input file, an output file, and a command that directly invokes the function are described. Among these functions, the function of managing photos will be now described as a representative example. The category of the function is "MediaManager" that executes a process of total management of content processing (browsing and storage), where an image file (JPEG file) is entered as an input file and the same image file (JPEG file) is output as an output file.

By referencing the application registration information described as it is, it becomes possible to acquire the information about functions related to the application which is being executed now. Therefore, the application having such functions may be started in a state of being able to execute the functions. Alternatively, if desired, it may be downloaded from any of the application providing servers 131 to 133 to the information processing apparatus 100. Likewise, the application having such functions may be started in a state of being capable of executing the functions.

1-5. Exemplary Processing of Application Management Unit

Referring now to FIG. 6, an exemplary process executed by the application management unit 157 will be described. FIG. 6 is a diagram mainly illustrating structural components relative to processes carried out by the application management unit 157 in the information processing apparatus 100. The storage unit 155 of the information processing apparatus 100 stores applications 201 to 203 which can be executed in the application executing unit 156 not shown in FIG. 6 (see FIG. 3). Furthermore, the storage unit 155 stores an application management program 211, which is executed by the application management unit 157, and application management information 212 about an application acquired, generated, updated, and so on in the application management unit 157.

The application management information 212 includes application information acquired from the management server 120. Here, the application information is one corresponding to each of the functions of the respective applications as described above with reference to FIG. 5. The application information is generated by the application providing server 131 or the like and managed in the management server 120. The application management unit 157 of the information processing apparatus 100 receives registration information about an application, such as one shown in FIG. 5, corresponding to each of the functions of the respective applications from the management server 120. Here, the application management unit 157 of the information processing apparatus 100 is able to receive application information directly from the application providing servers 131 to 133 without a passage through the management server 120.

The application information received by the application management unit 157 is stored as a structural component of the application management information 212 in the storage unit 155.

During the execution of an application in the application executing unit 156 (see FIG. 2) not shown in FIG. 6, the application management unit 157 presents a list of applications related to an application being executed to the output 152. This corresponds to the function/application recommendation list display areas 162 and 163 previously explained with reference to FIG. 3.

In the function/application recommendation list display area 162 on the lower left side in FIG. 3 shows information about an application previously stored in the storage unit 155. Specifically, such an application is a pipe-connect application connected with the solid line as shown in FIG. 4, for example, when the execution application is one corresponding to the application module A shown in FIG. 4.

The function/application recommendation list display area 163 on the lower right side shown in FIG. 3 shows information about an application which has not been stored in the storage unit 155. Specifically, such an application is an application connected with the dotted line as described above with reference to FIG. 4.

The application management unit 157 determines functions to be displayed on the function/application recommendation list display areas 162 and 163 and the order of applications listed in the application list, based on the application management information 212 stored in the storage unit 155 and information acquired from an environmental information acquisition unit 231 including a timer, a global positioning system (GPS), and the like.

The application management information 212 stored in the storage unit 155 includes information about each of applications, information about the relation among the respective applications which have been described with reference to FIG. 4, and hardware information (hardware profile) of the image processing apparatus, user information (user profile), and so on. The application management unit 157 determines the functions of the applications and the order and contents of the application list to be displayed on the function/application recommendation list display areas 162 and 163, on the basis of the information acquired from an environmental information acquisition unit 231. Then, the application management unit 157 outputs them to the output unit 152.

Furthermore, as previously described with reference to FIG. 4, the application management unit 157 executes the generation, update, or the like of application-related information, which is the management information representing the relation between the applications. The application-related information is made initially based on the application information received from the management server 120 or the like. Then, the application information is subjected to an update, such as a process of making a pipe connection (solid line in FIG. 4), depending on the state of executing the application by the user.

For example, if a new application is downloaded from any of external application providing servers 131 to 133 and stored in the storage unit 155 of the information processing unit 100, the application management unit 157 updates the application-related information. Here, referring now to FIG. 7, the update of the application-related information carried out by the application management unit 157 will be described.

Figure 7:
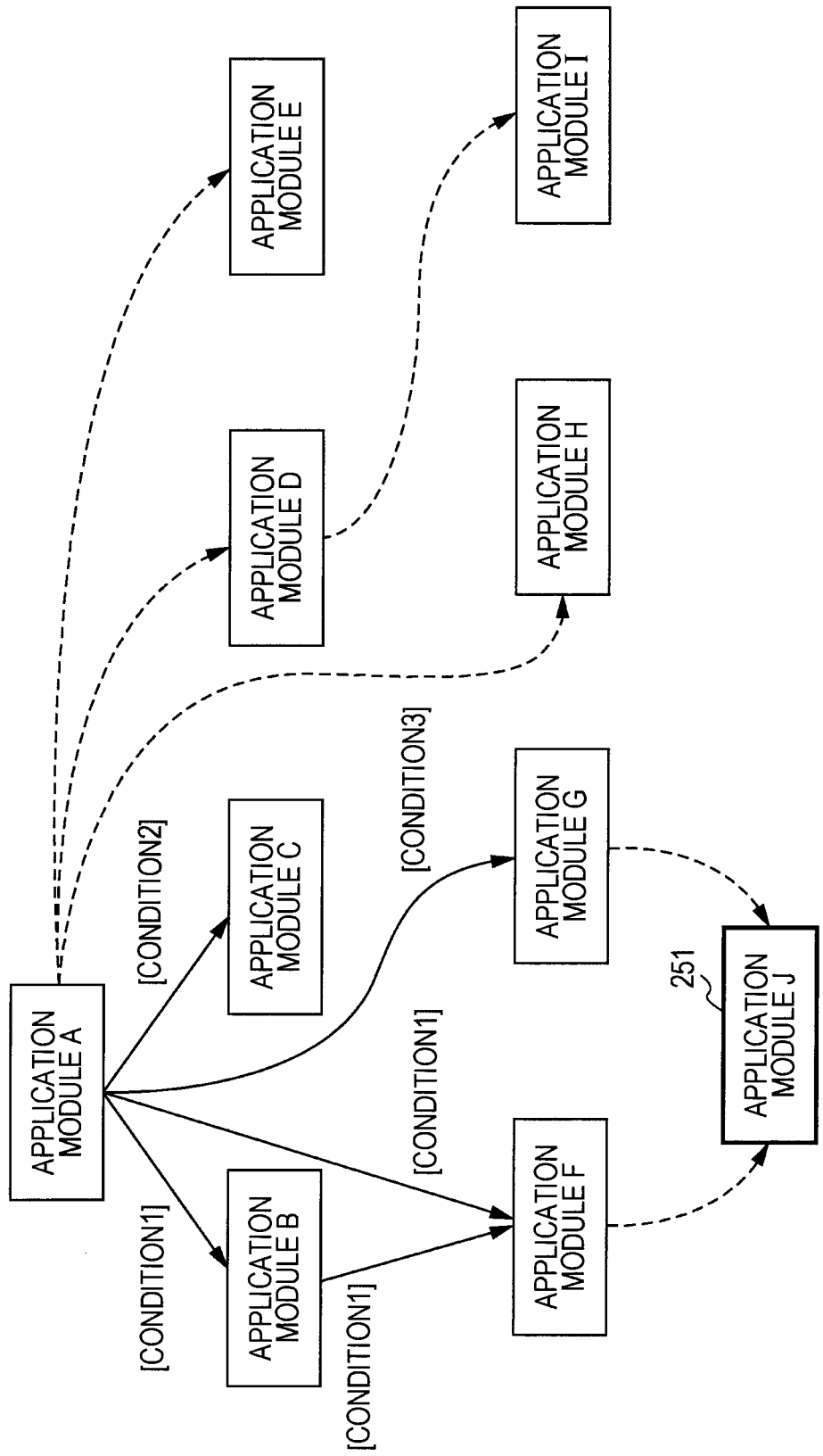
FIG. 7 is a diagram illustrating the update of the application-related information carried out by the application management unit.

In FIG. 7, an application module J 251 is an application newly downloaded from the outside. In this case, application information corresponding to the application module J 251 (see FIG. 5) and application information corresponding to other applications being set to the application-related information are referenced to determine the connection relationship between the application module J 251 and any of other applications. Here, the initial connection, the connection between applications which have interactions with one another but have not been subjected to application switching in the past, is represented by the dotted line (imaginary line).

Subsequently, if the application J is executed again, an update is carried out so that the previous execution application serves as the origin of the connecting solid arrow (start point) and the application J serves as the end thereof (endpoint). The update processing allows the application J to be registered as an application in pipe connection with any of other applications. In execution of the pipe-connected application, the application J is preferentially displayed on the list of recommended applications.

As has been described above, when the application management unit 157 determines applications to be displayed on the recommended application list, the application management unit 157 analyzes information about hardware used by the user (hardware profile) and information about preference or the like of the user (user profile). Subsequently, a list is generated and displayed so that an application, which is determined as one suitable for the hardware or user type depending on the results of the analysis, is placed at the head of the list.

1-6. Presentation Procedure for Application/Function

Next, a presentation procedure for applications or the functions thereof to the user of the image processing apparatus 100 in the information processing system 1 according to the embodiment of the present invention. FIG. 8 is a flow chart representing the presentation procedure for applications or the functions thereof to the user of the information processing apparatus 100. Hereafter, the presentation procedure for applications or the functions thereof to the user of information processing apparatus 100 will be described with reference to FIG. 8.

FIG. 8 illustrates the application executing unit 156 that performs an application, the application management unit 157, and the application management server 120 that offers application information. The user of the information processing apparatus 100 makes a switch from an application being executed in the application executing unit 156 (hereinafter, referred to as a "first application") to another application (hereinafter, referred to as a "second application"). In the case of executing the second application, for example, the data or parameters used in the first application may be successively used in the second application. In this case, a process of handing over the context information including information about the execution state of the first application or the like to the second application. The application management unit 157 controls the process of handing over the context information.

In the example shown in FIG. 8, the management server 120 is illustrated on the right side. The application management unit 157 of the information processing apparatus 100 is set to advance the processing shown in FIG. 8 while communicating with the management server 120. As has been described above, the management server 120 provides the information processing apparatus 100 with application information about various kinds of applications. The example shown in FIG. 8 is designed so that processing is carried out using the application information held in the management server 120 and the results of the processing is then supplied to the application management unit 157 of the information processing apparatus 100.

As has been described above, the application management unit 157 of the information processing apparatus 100 may acquire application information from the management server 120 in advance and then store the application information in the recording unit 155 of the information processing apparatus, followed by utilizing the application information. In this case, the processing carried out by the management server 120 on the right side shown in FIG. 8 can be performed as processing in the application management unit 157 of the information processing apparatus 100. In this configuration, the application management unit 157 is allowed to carry out the processing without communication with the management server 120.

Hereinafter, the processing in each of the application executing unit 156, the application management unit 157, and the management server 120 will be described with reference to FIG. 8. In the following description, the processing will be described with the assumption that a combination of tree units, the application executing unit 156, the application management unit 157, and the management server 120, performs the process of presenting an application or the function thereof to the user of the information processing apparatus 100.

First, the application executing unit 156 in execution of the first application supplies the context information to the application management unit 187 (Step S101). The context information is information about the program-executing state of the first application. The context information includes data format information, used parameter information, and so on. In addition, the context information also includes information about intention to input or output the content of which format from which category.

In the above step S101, the application management unit 157 which has received the application information from the application executing unit 156 passes the context information received from the application executing unit 156 to the management server 120 (Step S102). The application management unit 157 also supplies information about the category of a frequently-executed application in the information processing apparatus 100 in conjunction with the supply of the context information to the management server 120.

The management server 120, which has received the context information from the application management unit 157 and the information about the category of the frequently-executed application, searches an available application relevant to the first application at a functional level (Step S103). This search process is performed using the application registration information (Appinfo) which has been received by the management server 120 from the application providing servers 131 to 133.

For example, in the context information supplied from the application executing unit 156 to the application management unit 157, if the category is "MediaManager", the file type is "Mpeg", the input/output selection is "In", then the management server 120 searches application registration information (Appinfo) and then selects one corresponding to the context information supplied from the application executing unit 156.

The management server 120 provides the application management unit 157 with a function list as a recommended candidate obtained as a result of the search process in the above step S103 (Step S104). In addition, from the installed applications in the storage unit 155 of the information processing apparatus 100, the application management unit 157 searches the function corresponding to the context information supplied from the application executing unit 156 in the above step S101 (Step S105).

In other words, the application management unit 157 generates by itself a function list of recommended candidates with respect to the applications stored in the storage unit 155. The application management unit 157 acquires an application list from the management server 120 with respect to the applications which are not stored in the storage unit 155. As has been described above, in the case where the application management unit 157 receives function information about the applications not stored in the storage unit 155 from the management server 120 and then stores the function information in the storage unit 155, the application management unit 157 may generate a function list for the applications which are not stored in the storage unit 155 without communication with the management server 120.

Subsequently, the application management unit 157 acquires management information about other applications already stored in the storage unit 155, such as a user profile and a hardware profile. Then, the application management unit 157 makes a comparison between the function list obtained from the management server 120 and the function list generated by itself on the basis of these pieces of the information to select a function having application information suitable for the hardware profile and the user profile, thereby determining the order of displaying the functions depending their respective matching degrees (step S106).

Subsequently, the application management unit 157 displays the generated recommended function list on the display unit mounted on the output unit 152 (Step S107). In the example shown in FIG. 3, a list of the functions of the applications already stored in the storage unit 155 of the information processing apparatus 100 is presented on the lower left function/application recommendation list display area 162. In contrast, on the function/application recommendation list display area 163 on the lower right of FIG. 3, a list of the functions of the applications which are not stored in the storage unit 155 of the information processing apparatus 100 and should be downloaded from the application providing server is presented.

Subsequently, the control unit 151 detects that one function which is desired to be executed is selected from the recommended function list presented on the display unit by the application management unit 157 by the user's operation (Step S108). Specifically, the control unit 151 detects that the user selects any of icons presented on the function/application recommendation list display areas 162 and 163 and then clicks the icon by a mouse or the like.

If the information about the function specified by the user is input into the application management unit 157 by a user's click operation or the like, the application management unit 157 updates the application management information (Step S109). In this step S109, for example, the setting of pipe connection or the like is carried out as a change in connection state between applications with respect to the application-related information showing the mutual relationship between the applications previously described with reference to FIG. 4.

In the above step S109, the function selected by the user of the information processing apparatus 100 allows the application management unit 157 to send the start instruction of an application having this function to the application executing unit 156 (Step S110). This application is defined as a second application. Then, the application management unit 157 directs the application executing unit 156 to start the application in a state that the user-selected function is executable (Step S111). Subsequently, the application management unit 157 provides the application executing unit 155 with the state information of the first application received from the application executing unit 155 in the previous step S101, or the context information containing processed data and parameters (Step S112). Furthermore, in the application executing unit 155, the execution of the second application is started in a state that the user-specified function is executable (Step S113).

Furthermore, if the data and the parameters used in the first application is desired to be converted into a format available in the second application, the application management unit 157 may perform their conversion. The demand of this process and the format thereof may be acquired from the application registration information (Appinfo) of each of the first and second applications.

If the user-selected function in the above step S108 is the function of an application which is not stored in the storage unit 155 of the information processing apparatus 100, the application management unit 157 acquires URL used for download of the application from the application information corresponding to the application where the specified function is executed. Then, the applications specified from the application providing servers 131 to 133 are downloaded and stored in the storage unit 155. In conjunction with this process, the application management information is also updated.

In the above description, the case where the second application is started after executing the first application in the application executing unit 156 has been described with reference to the flowchart shown in FIG. 8. In the application executing unit 156, different applications are sequentially executed. It is noted that there is a case where the application executing unit 156 further start and execute any of other applications (the third application, the fourth application, or the like).

The application management unit 157 may allow the storage unit 155 to store the history of an application executed in the application executing unit 156 while including the history data in the application management information. The application management unit 157 may acquire the application-execution history information from the storage unit 155 and display the history information on the display unit. As shown in FIG. 9, for example, the application management unit 157 may display the information about history of executing an application in the information processing device 100 on a display area 164 for function/application-execution history information.

Furthermore, display data such as icons associated with the respective applications may be provided with link information for invoking any of these applications to allow the application to be activated when the user clicks the corresponding icon.

Therefore, from the management server 120 and the application management unit 157, the application executing unit 156 of the information processing apparatus 100 searches a function suitable for execution in cooperation with the running function of the application being executed by the application executing unit 156 to generate a function list. Subsequently, the resulting list is presented on the display unit to allow the user of the information processing apparatus 100 to easily recognize a suitable function if it is executed in cooperation with the running function. The execution of the presented function allows the functions of the applications to work smoothly with one another.

Next, a concrete example of the process of presenting a recommended function will be described. As has been described above, for example, the application management unit 157 monitors the state of application execution in the application execution unit 156 of the information processing apparatus 100 to generate or update the application management information, followed by storing the information in the storage unit 155. Furthermore, the management server 120 may be optionally provided with the application management information.

For example, in the information processing apparatus 100, the application management unit 157 acquires information about the execution history (log) of an application executed by the application executing unit 156 and then stores the acquired history in the storage unit 155. Furthermore, the application management unit 157 uses the execution history information (log) to update the application management information. Specifically, for example, the application management unit 157 carries out processing such as a process of setting an application linking state of application relation information as described with reference to FIG. 4 in a pipe connection state represented by the solid arrow shown in the same figure. In addition, the application management unit 157 also displays the information on a history of executions of application programs on the application execution history information display area 164 described with reference to FIG. 9.

As described above, in the information processing apparatus 100, the application management unit 157 acquires the history information about application execution in the application executing unit 156 and generates or updates application management information. In addition, the application management unit 157 receives, for example, application information such as a context from the application execution unit 156 and then selects recommended function and recommended application, which are recommended to be executed next on the basis of the received application information. The presentation process is displayed on the recommended-application list display areas 152 and 153 shown in FIGS. 3 and 9. This is a process described earlier by referring to the processing sequence shown in FIG. 8. In the step S101 of FIG. 8, as described above, the application management unit 157 receives application information, such as context information, from the application execution unit 186.

The application management unit 157 searches recommended function candidates related to the first application being executed by the application executing unit 156 from the applications already stored in the local storage unit and then generates a function list including the search results (process in step S103 of FIG. 8).

Furthermore, the application management unit 157 itself generates a function list including recommended candidates with respect to the function of the application stored in the memory unit 155. In addition, the application management unit 157 acquires a function list from the management server 120 with respect to the function of the application which is not stored in the storage unit 185. In other words, in the step S102 of FIG. 8, the application management unit 187 sends application information, such as context, to the management server 120, followed by acquiring a function list from the management server 120.

In the following description, a concrete example of an application recommended process carried by the application management unit 157 or the management server 120 will be described. Furthermore, in the example described below, the functions of an application carried out in the information apparatus 100 shown in FIG. 1 will be described as one of six functions, (a) to (f) shown in FIG. 10, as follows:

(a) Media editor
(b) Media uploader
(c) Media converter
(d) Media manager
(e) Media database
(f) Media browser (a) A media editor is an application program to be executed to carry out processing to edit and create a content.

(b) A media uploader is an application program to be executed to carry out processing to upload a content to a server such as a Web Service Server.

(c) A media converter is an application program to be executed to carry out media conversion processing such as a process to rotate, enlarge or contract an image which serves as a content.

(d) A media manager is an application program to be executed to carry out processing to execute comprehensive management of content processes such as a process to browse contents and a process to save contents. The media manager has functions of a media database and a media browser.

(e) A media database is an application program to be executed to carry out processing to execute database management such as a process to add a content to a database and a process to delete a content from a database.

(f) A media browser is an application program to be executed to carry out processing to browse a content.

The information processing apparatus 100 executes an application having at least one of the functions (a) to (f) listed above. When the information processing apparatus 100 executes any one of the above functions (a) to (f) on the application executing unit 156, the application executing unit 156 supplies application information including context information to the application management unit 157. This process corresponds to one shown in the step S101 of FIG. 8.

The application management unit 157 supplies application information to the management server 120 (Step S102 of FIG. 8). Furthermore, a recommended application list is prepared with reference to the application registration information (Step S103 of FIG. 8). Also, the management server 120 references to the application information to create a recommended application list (Step S104 of FIG. 8). The application management unit 157 presents the list of recommended applications selected in the management server 120 on the output unit 152 of the information processing apparatus 100. This is a presentation process carried out on each of the function/application recommendation list display areas 162 and 163 shown in FIG. 3 and FIG. 9.

Figure 11:
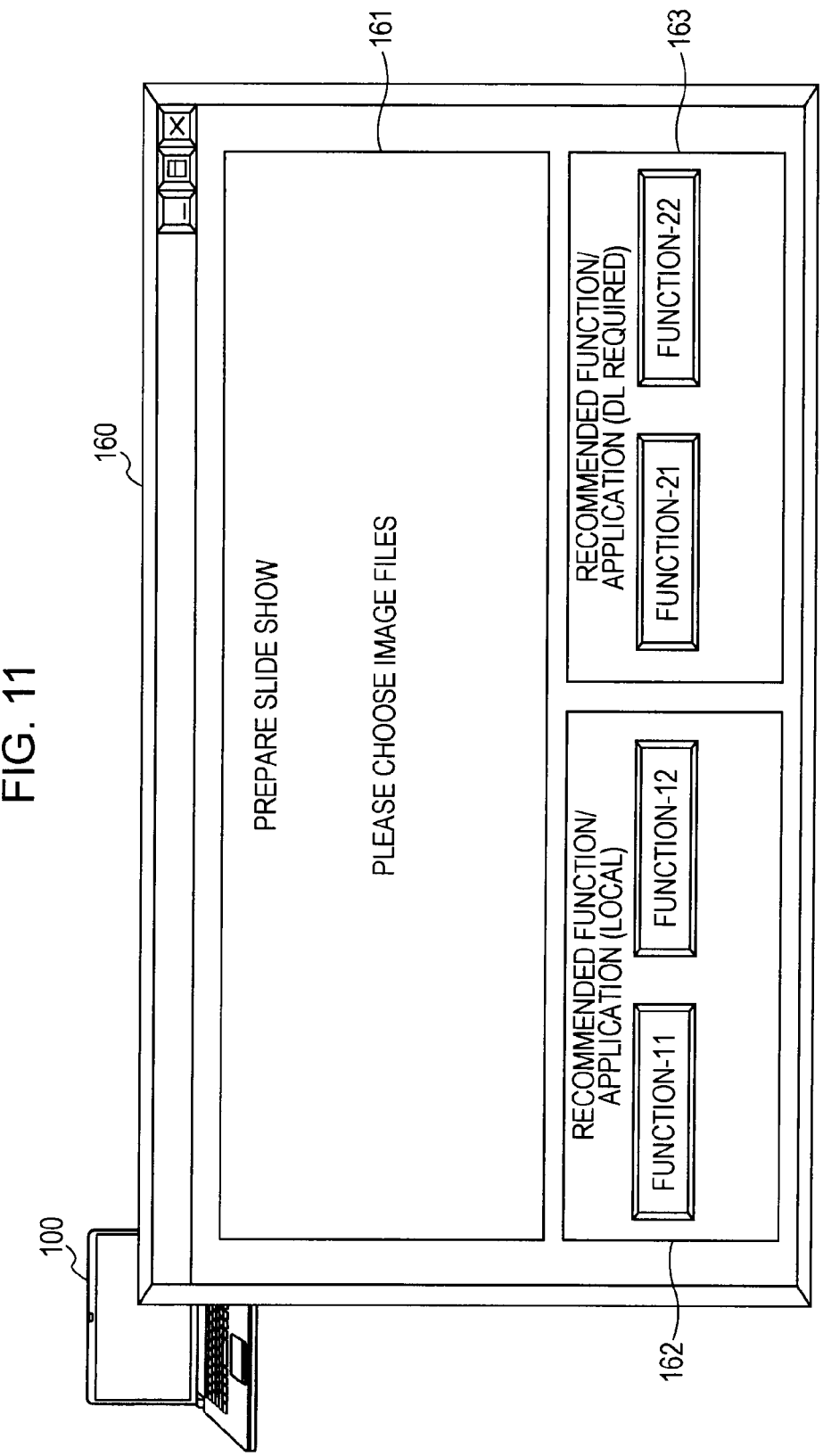
FIG. 11 is a diagram illustrating an example of cooperation work of applications executed in the information processing apparatus according to one embodiment of the present invention.
Figure 12:
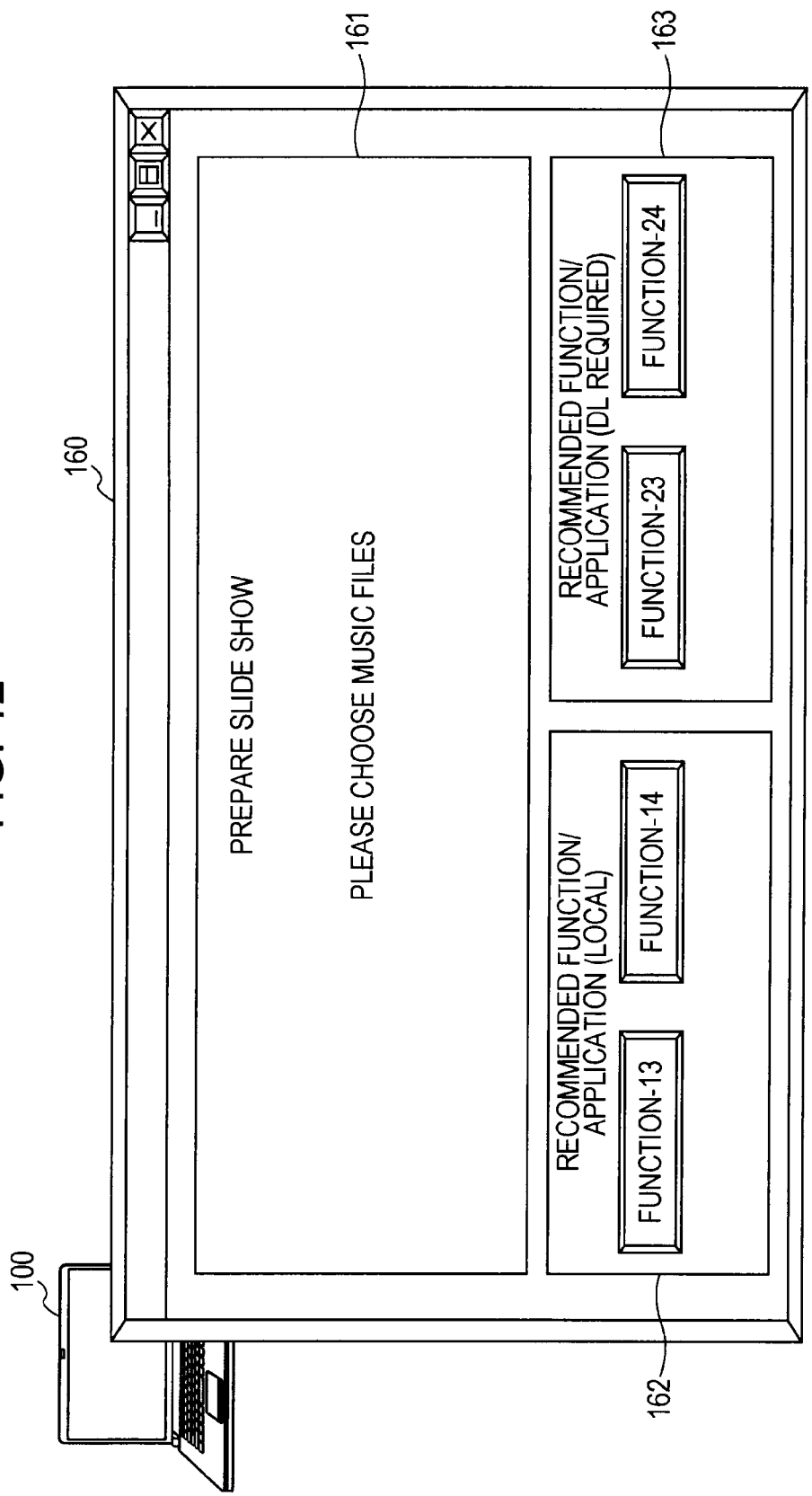
FIG. 12 is a diagram illustrating an example of cooperation work of applications executed in the information processing apparatus according to one embodiment of the present invention.
Figure 13:
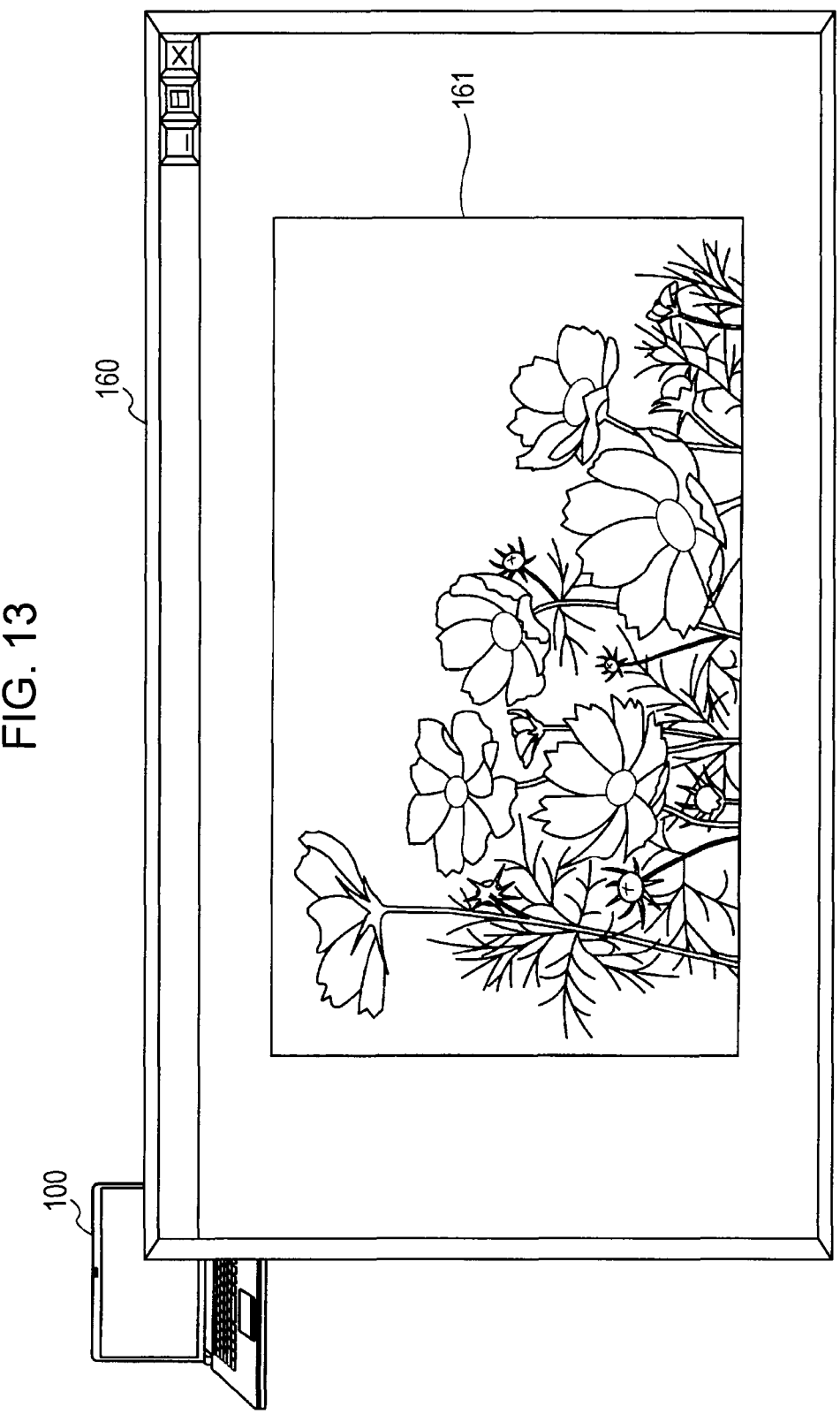
FIG. 13 is a diagram illustrating an example of cooperation work of applications executed in the information processing apparatus according to one embodiment of the present invention.

Here, in the following description, a concrete example of the aforementioned process for presenting functions will be described. FIG. 11 to FIG. 13 are diagrams illustrating examples of cooperation work of applications executed in the information processing apparatus 100 according to one embodiment of the present invention.

FIG. 11 is a diagram illustrating a case where an application for creating a movie (slide show) in which photos are sequentially displayed while reproducing music on the application execution area 161 displayed on the output unit 152 of the information processing apparatus 100 (hereinafter, such an application is referred to as a slideshow creation application). This slideshow creation application can create a slideshow by choosing a musical file to play after choosing image files to be displayed with the music.

If the user of the information processing apparatus 100 starts the slideshow creation application on the information processing apparatus 100, a screen for selecting image files is displayed first on the application execution area 161 by the application executing unit 156. Then, the application management unit 157 looks up in the application registration information (Appinfo) and then presents a function suitable for selection of image files to the function/application recommendation list display areas 162 and 163. Here, since the application management unit 157 is in a state of selecting image files, the application management unit 157 acquires a function of executing the output of image files from the application registration information (Appinfo). The user of the information processing apparatus 100 can execute an application having a function suitable for selection of image files by selecting the function from icons presented on the function/application recommendation list display areas 162 and 163.

The user of the information processing apparatus 100 employs an application to be executed by selecting the corresponding function presented on the function/application recommendation list display areas 162 and 163 to select image files to be used in a slideshow. Subsequently, the application executing unit 156 allows the application execution area 161 to display a screen for selecting a music file to be used in the slideshow creation application. Then, the application management unit 157 shows appropriate functions for music file selection on the function/application recommendation list display areas 162 and 163. Here, since the application management unit 157 is in a state of selecting image files, the application management unit 157 acquires a function of executing the output of a music file from the application registration information (Appinfo). The user of the information processing apparatus 100 can execute an application having a function suitable for music file selection by selecting the function from icons presented on the function/application recommendation list display areas 162 and 163.

The user of the information processing apparatus 100 employs an application to be executed by selecting the corresponding function presented on the function/application recommendation list display areas 162 and 163 to select a file of music to be used in a slideshow. The slideshow creation application creates a slideshow using the image files and the musical file selected by the user and displays the slideshow on the application execution area 161 as shown in FIG. 13.

Here, the application having a function suitable for image file selection may be the same application as one having a function suitable for music file selection. In the case where the user may select a desired function from icons presented on the function/application recommendation list display areas 162 and 163, however, the application executing unit 156 starts the application in a state of being executable to select any of image files when the user intends to choose the image file, while starting the application in a state of being executable to select any of music files when the user intends to choose the music file. In the example shown in FIG. 11 to FIG. 13, when the application managed using the application registration information as shown in FIG. 5 is executed, the user specifies a "picture" command to start the application when selecting an image file. Then, the function of allowing the user to directly select an image file is activated. Likewise, in the case of music file selection, the user specifies a "music" command to start the application. Then, the function of allowing the user to directly select a music file is activated. Thus, the application is started in a state of being executable to activate a suitable function depending on the situation. In this case, even if an application having a plurality of function is invoked from a certain application, the application being invoked is allowed to directly activate a suitable function depending on the situation.

Here, it is noted that the details of the application-recommending process in a system having a data structure like the one described above are also described in the specification of Japanese Patent Application No. 2009-218736 which has been filed by the same applicant and inventors as those of the present invention.

For example, the application management unit 157 may extract an application having a high probability of being executed subsequent to the currently running application or having an ability of executing a similar function, or extract a desired function of the application to present the extracted application or function to the user of the information processing apparatus 100. For example, an execution status log of the application executed by the user of the information processing apparatus 100 may be held in the inside of the information processing apparatus. In this case, the application management unit 157 can find the tendency of execution of a certain application subsequent to the execution of one application. Thus, the application management unit 157 may extract an application or the function thereof relative to the certain application from the application registration information, followed by presenting the extracted application or the function thereof to the user.

A concrete example of such a process will be described bellow. When the user of the information processing apparatus 100 executes an application (application A) that displays a list of image files in a thumbnail format, it may be found that the user mostly intends to choose one image file and execute image processing on the image file using another application (application B). In this case, the application management unit 157 can extract the information about an application and the function thereof to carry out the image processing in addition to the information about the application B and the function thereof when the application A is being executed, and then present the information on the function/application recommendation list display areas 162 and 163. In other words, the user can recognize a new processing process or another processing process by presenting the information about the image-processing executable application and the function thereof to the user.

1-6. Presentation Procedure for New Function

By applying this function presentation process, the application management unit 157 can also present the information about new function added by the upgrade of the application on the function/application recommendation list display areas 162 and 163. Nowadays, one application may have a wide variety of functions and may be frequently upgraded with the addition of functions. Therefore, in many cases, new functions may be added to the application without noticing by the user. The application manufacturer may encounter the fact that the user may loss a chance of using a long-awaited additional function. Hereinafter, the process of presenting information about a new function added by the upgrade of an application on the function/application recommendation list display areas 162 and 163 will be described.

FIG. 14 is an explanatory diagram illustrating an example of the application registration information (Appinfo) to be used for the presentation of information about new function. As shown in FIG. 14, with respect to the application registration information (Appinfo), the version of the present application is filled in the field tagged with "ver". In addition, the information about the version of the upgraded application with the additional function is filled in the field tagged with "add ver" in each of the regions where the pieces of information about the respective functions are described. Here, in the example shown in FIG. 14, the addition of functions is managed using the version number. Alternatively, the addition of functions may be managed using the data in stead of the version number.

The example in FIG. 14 shows that the version of the present application is 2.0. It is also shown that, among the functions of the application, the function "PHOTO MANAGEMENT" is a function added to the version 1.0, the functions "MUSIC MANAGEMENT" and "VIDEO MANAGEMENT" are functions added to the version 1.2, and the function "3D PHOTO PROCESSING" is a function added to the version 2.0. The application management unit 157 can find that the function "3D PHOTO PROCESSING" is a new function added to the version 2.0 by referring to the application registration information (Appinfo).

FIG. 15 is an explanatory diagram illustrating an example in which information about new function added by the upgrade of an application is presented on the function/application recommendation list display area 162 by the application management unit 157. In FIG. 15, the function "photo management" is performed on the application execution area 161. FIG. 15 illustrates an example in which an icon marked with "3D" that means the function "3D PHOTO PROCESSING", which is a function relative to the function "PHOTO MANAGEMENT", is presented on the function/application recommendation list display area 162 by the application management unit 157. The application management unit 157 may superimpose the character "NEW" on the icon to represent that the function "3D PHOTO PROCESSING" is a new additional function in a clearly understandable manner. Alternatively, the icon may be of blinking or the periphery of the icon may be rimmed with a striking color.

Furthermore, the application management unit 157 and the management server 120 may search any function relevant to the function "PHOTO MANAGEMENT" and the application management unit 157 may present the search results in icon form on the function/application recommendation list display area. Alternatively, the application management unit 157 may display the new additional function with higher priority than the search results. The "display with higher priority" may be, for example, the display of an icon of the new additional function allowed by the application management unit 157. In addition, the icon of the new additional function may be displayed on the left from the search results.

In this way, the application management unit 157 references to the application registration information (Appinfo) and extracts a new additional function of an application, followed by presenting the function on the screen. Thus, the user of the application can easily find what kind of function newly added. Furthermore, the application management unit 157 displays the new additional function with higher priority than other functions. Therefore, the new additional function can be easily used.

It is noted that the procedures of managing the functions of applications and the procedures of presenting icons on the function/application recommendation list display areas 162 by the application management unit 157 are not limited to the aforementioned example. Alternatively, for example, the functions of applications may be managed hierarchically.

FIG. 16 is an explanatory diagram illustrating an example of a case where the functions of applications are hierarchically displayed and managed on function/application recommendation list display areas 162. In the example shown in FIG. 16, the application management unit 157 allows the function/application recommendation list display area 162 to display an "EDIT" icon and also displays a "3D" icon and a "SEPIA" icon on a hierarchically lower level than the "EDIT" icon. The "3D" icon is an icon for invoking the function of executing the conversion of a photo into a three-dimensional (3D) photo and the "SEPIA" icon is an icon for invoking the function of converting the color of a photo into a sepia color. Furthermore, the application management unit 157 may hierarchically display the icons on the function/application recommendation list display area 162 to hierarchically manage the functions of applications.

In the above description, the process of presenting the information about a new additional function added by the upgrade of an application on the function/application recommendation list display areas 162 and 163 has been described. Next, the configuration of the management server 120 and the configuration of the application providing server 131 will be described.

1-7. Configuration of Each Server

FIG. 17 is an explanatory diagram illustrating the configuration of the management server 120 and the application providing server 131 according to one embodiment of the present invention. Hereinafter, the configuration of the management server 120 and the application providing server 131 according to one embodiment of the present invention will be described with reference to FIG. 17.

As sown in FIG. 17, the management server 120 includes a control unit 521 that performs data processing to which various programs can be applied, a communication unit 522 that communicates through a network, and a storage unit 523 that stores application information, user management information, and so on.

The management server 120 supplies application information to the information processing apparatus 100 of the user. In addition, the management server 120 performs the registration of user's hardware information, the management thereof, and so on.

The application providing server 131 includes a control unit 531 that performs that performs data processing to which various programs can be applied, a communication unit 532 that communicates through a network, and a storage unit 533 that stores application programs, application information, and so on.

The application providing server 131 supplies an application in response to a request from the user information processing apparatus 100. The information processing apparatus 100 executes applications, which are supplied from the application supplying server 131, on a function basis. Therefore, the image processing apparatus 100 is allowed to directly execute a desired function relative to the currently running function.

2. CONCLUSION

As described above, according to the embodiment of the present invention, the application management unit of the information processing apparatus of the user creates and displays a list of recommended functions and recommended applications corresponding to a first application executed in the information processing apparatus. The application management unit analyzes the function/application information corresponding to the first application and the function/application information corresponding to other applications. Furthermore, the application management unit employs a hardware profile and a user profile to select an application and the function thereof perfect for the hardware and the user as a recommended application and a recommended function. Then, the application management unit presents the recommended application and the recommended function to the user. Such a configuration of the application management unit allows the user to easily acquire an optimal application without application search or the like.

According to the embodiment of the present invention, by describing the information about a new additional function on the application registration information (Appinfo), it is possible to extract the new additional function added by the upgrade of the application, present the function thereof with higher priority, and present the function thereof with emphasis. Therefore, the user can recognize the addition of a new function added by the upgrade, so that the user can be allowed to use the new additional function.

It is noted that a series of the aforementioned processes described herein may be performed by hardware, software, or a combination thereof. If the processes are carried out using the software, a program in which a process sequence is incorporated is executed after being installed into the memory of a computer built in a dedicated hardware or after being installed into a general-purpose computer where various kinds of processing are executable. For example, the program may be recorded on a recording medium in advance. The program may be installed into a computer through the recording medium. Alternatively, the program may be received through a network, such as a local area network (LAN) or the Internet, and then installed into a recording medium, such as an internal hard disk.

Preferred embodiments have been described in detail with reference to the attached drawings. However, the present invention is not limited to these embodiments. A person skilled in the art will be easily recognized that various modifications and improvements can be easy attained within the technical ideas described in claims and naturally recognized that these modifications and improvements will belong to the technical scope of the present invention.

The present application contains subject matter related to that disclosed in Japanese Priority Patent Application JP 2009-241512 filed in the Japan Patent Office on Oct. 20, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising: an application executing circuit, wherein the application executing circuit is a processor device, configured to supply application information of a first application to an application management circuit, the first application including one or more functions; and the application management circuit, the application management circuit configured to transmit the application information to a management server; receive a candidate function list, the candidate function list including a that information about a plurality of functions of a second application wherein the plurality of functions of the second application being different than the one or more functions of the first application; control display of a recommended function list according to the candidate function list; receive a user selection of a desired function from the recommended function list; and supply a start instruction to start the desired function of the second application to the application executing circuit, wherein the application executing circuit is configured to execute the second application including the desired function in response to the start instruction from the application management circuit.

2. The information processing apparatus according to claim 1, wherein said application executing circuit is configured to select more than one function of the second application and to execute said more than one function.

3. The information processing apparatus according to claim 1, further comprising:
a recommendation control circuit configured to recommend one of the plurality of functions of the second application based on information obtained from the function managing unit.

4. The information processing apparatus according to claim 3, wherein
said application management circuit is configured to compare the candidate function list with information including a user profile list to generate the recommended function list, and
the recommendation control circuit is configured to recommend one of the plurality of functions of the second application based on recommended function list.

5. The information processing apparatus according to claim 3, wherein said application management circuit presents the functions of the second application included in the recommended function list in a hierarchical structure.

6. The information processing apparatus according to claim 1, wherein said application management circuit manages the functions of said first application on a version basis.

7. The information processing apparatus according to claim 3, wherein said recommendation control circuit extracts a new function from the plurality of functions of the second application and recommends the new function.

8. The information processing apparatus according to claim 7, wherein said recommendation control circuit extracts the new function and recommends the new function on a priority basis.

9. A function management method, comprising, supplying, by an application executing circuit, wherein the application executing circuit is a processor device, application information of a first application to an application management circuit, the first application including one or more functions; transmitting, by the application management circuit, the application information to a management server; receiving a candidate function list, by the application management circuit, the candidate function list including information about a plurality of functions of a second application based the plurality of functions of the second application being different than the one or more functions of the first application; and controlling, by the application management circuit, display of a recommended function list according to the candidate function list; receiving, by the application management circuit, a user selection of a desired function from the recommended function list; supplying, by the application management circuit, a start instruction to start the desired function of the second application to the application executing circuit; and executing, by the application executing circuit, the second application including the desired function in response to the start instruction from the application management circuit.

10. A non-transitory computer-readable medium storing computer-executable instructions that, when executed by processing circuitry of a computer, cause the computer to: receive application information of a first application from an application management circuit, wherein the application executing circuit is a processor device, the first application including one or more functions; transmit the application information to a management server; acquiring receive a candidate function list, the candidate function list including information about a plurality of functions of a second application the plurality of functions of the second application being different than the functions of the first application; and control display of a recommended function list according to the candidate function receive a user selection of a desired function from the recommended function list; and supply a start instruction to start the desired function of the second application to the application executing circuit.

11. The information processing apparatus according to claim 1, wherein the application management circuit is configured to select a recommended candidate function from applications stored in a memory.

12. The information processing apparatus according to claim 1, wherein the application management circuit is configured to control display of the recommended function list within a recommended function list area.

13. The information processing apparatus according to claim 12, wherein the application management circuit is configured to control display the second application within an application execution area.

14. The information processing apparatus according to claim 12, wherein
the recommended function list area includes a first area and a second area,
the first area including a first list of local application functions, and
the second area including a second list of application functions that require download.

15. The function management method according to claim 9, further comprising:
selecting, by the application management circuit, a recommended candidate function from applications stored in a memory.

16. The function management method according to claim 9, wherein
the recommended function list is displayed within a recommended function list area.

17. The function management method according to claim 16, further comprising:
controlling display of the second application within an application execution area.

18. The function management method according to claim 16, wherein
the recommended function list area includes a first area and a second area,
the first area including a first list of local application functions, and
the second area including a second list of application functions that require download.

19. The function management method according to claim 9, further comprising selecting, by the application executing circuit, more than one function of the second application.

20. The function management method according to claim 9, further comprising:
comparing, by the application management circuit, the candidate function list with information including a user profile list to generate the recommended function list; and
recommending one of the plurality of functions of the second application based on the recommended function list.

* * * * *